(12) United States Patent
Yoshida

(10) Patent No.: US 7,098,938 B2
(45) Date of Patent: Aug. 29, 2006

(54) MULTI-BEAM SCANNING OPTICAL APPARATUS AND IMAGE FORMING APPARATUS USING THE SAME

(75) Inventor: Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 09/964,658

(22) Filed: Sep. 28, 2001

(65) Prior Publication Data

US 2002/0057327 A1 May 16, 2002

(30) Foreign Application Priority Data

Sep. 29, 2000 (JP) ........................................ 2000/299497
Sep. 21, 2001 (JP) ........................................ 2001/288528

(51) Int. Cl.
*B41J 27/00* (2006.01)

(52) U.S. Cl. ........................................ 347/244; 347/258
(58) Field of Classification Search ................. 347/116, 347/241, 243, 244, 256, 258, 259; 359/487
See application file for complete search history.

(56) References Cited

U.S. PATENT DOCUMENTS

| | | | | |
|---|---|---|---|---|
| 4,634,232 A | * | 1/1987 | Tateoka | 359/487 |
| 5,786,911 A | | 7/1998 | Tawa et al. | 359/17 |
| 5,991,063 A | * | 11/1999 | Ando | 359/204 |
| 6,081,386 A | * | 6/2000 | Hayashi et al. | 359/641 |
| 6,134,040 A | | 10/2000 | Rim et al. | 359/207 |
| 6,154,303 A | | 11/2000 | Rim et al. | 359/207 |
| 6,198,562 B1 | * | 3/2001 | Hayashi et al. | 359/204 |

FOREIGN PATENT DOCUMENTS

| | | |
|---|---|---|
| EP | 0 804 015 | 10/1997 |
| JP | 6-347713 | 12/1994 |
| JP | 9-54263 | 2/1997 |
| JP | 10-20222 | 1/1998 |
| JP | 2000-19448 | 1/2000 |
| JP | 2000-131632 | 5/2000 |

* cited by examiner

*Primary Examiner*—Hai Pham
(74) *Attorney, Agent, or Firm*—Fitzpatrick, Cella, Harper & Scinto

(57) ABSTRACT

A multi-beam scanning optical apparatus includes an incident optical system for making a plurality of light beams emitted from light source means having a plurality of light emitting portions incident on a deflector, and a scanning optical system for forming images of the plurality of light beams deflected by the deflector on a surface to be scanned. The scanning optical system has at least one scanning optical element made of a resin. The scanning optical element made of the resin has birefringence due to a stress distribution generated upon cooling in a molding process thereof such that the directions of principal axes of birefringence at one end portion of the scanning optical element are different from those at the other end portion, opposite to the one end portion with respect to an optical axis thereof in a main scanning direction, of the scanning optical element. An interval between adjacent scanning lines formed on the scanning surface by the plurality of light beams whose images are formed on the scanning surface through the scanning optical element made changes in the main scanning direction in an effective scanning region. In the apparatus, a sub-scanning interval error between the scanning lines due to a polarization angle difference between the light beams emitted from the plurality of light emitting portions is so set as to be not more than ⅕ of a desired scanning line interval.

18 Claims, 20 Drawing Sheets

POLARIZATION DIRECTION
OF INCIDENT BEAM

POLARIZATION DIRECTION

POLARIZATION DIRECTION

POLARIZATION DIRECTION

POLARIZATION DIRECTION OF INCIDENT BEAM

PRINCIPAL AXES

STRESS DISTRIBUTION LINE

MULTI-BEAM SCANNING OPTICAL APPARATUS AND IMAGE FORMING APPARATUS USING THE SAME

BACKGROUND OF THE INVENTION

1. Field of the Invention

The present invention relates to a multi-beam scanning optical apparatus and image forming apparatus using the same and, more particularly, to an image forming apparatus such as a laser beam printer having, e.g., an electrophotographic process, digital copying machine, or multi-functional printer, in which a plurality of light beams emitted from a light source means having a plurality of light emitting portions are deflected by a polygon mirror serving as an optical deflector and then caused to be optically scanned on a surface to be scanned through scanning optical means having an f-θ characteristic so as to record image information.

2. Related Background Art

A scanning optical apparatus (scanning optical system) conventionally used for an image forming apparatus is often designed to guide a light beam emitted from light source means to deflection means through an incident optical means and to form and scan the spot image of the light beam deflected by the deflection means on a surface to be scanned through scanning optical means having an f-θ characteristic.

Along with the recent improvement in performance and multi-functional ability of image forming apparatuses, scanning optical apparatuses are also required to operate at a high speed. To meet this requirement for high-speed operation, a plurality of light sources (light emitting portions) are used. In, e.g., Japanese Patent Application Laid-Open No. 9-54263, a multi-beam laser chip for emitting a plurality of linearly arranged light beams (laser beams) from one chip is used as light source means.

In an image forming apparatus, generally, if the interval between scanning lines in the sub scanning direction changes depending on position due to various reasons, the printed image quality degrades. Especially, this phenomenon readily takes place in a multi-beam scanning optical apparatus having a plurality of light emitting portions because of the presence of the plurality of light emitting portions.

SUMMARY OF THE INVENTION

It is an object of the present invention to provide a multi-beam scanning optical apparatus which reduces errors in interval between scanning lines in a sub-scanning direction within the effective scanning region by setting elements such that the sub-scanning interval error between the scanning lines on the scanning surface, which is caused by a difference in polarization angle between light beams emitted from a plurality of light emitting portions, falls within a predetermined value/level, thereby executing high-quality printing at a relatively low cost, and an image forming apparatus using the same.

According to one aspect of the invention, there is provided a multi-beam scanning optical apparatus which comprising:

incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of a resin, and said scanning optical element made of the resin has birefringence due to a stress distribution generated upon cooling in a molding process thereof such that the directions of principal axes of birefringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanning surface by the plurality of light beams whose images are formed on the scanning surface through said scanning optical element made of the resin changes in the main scanning direction in an effective scanning region, and wherein said apparatus comprises at least one setting means for setting a sub-scanning interval error between the scanning lines due to a polarization angle difference between the light beams emitted from the plurality of light emitting portions to be not more than ⅕ of a desired scanning line interval.

In further aspect of the scanning optical apparatus according to the invention, the direction of the principal axes of the birefringence at the end portions of said scanning optical element made of the resin form an asymmetrical distribution due to the stress distribution generated upon cooling in the molding process of said scanning optical element made of the resin.

In further aspect of the scanning optical apparatus according to the invention, said apparatus has a plurality of scanning optical elements made of the resin.

In further aspect of the scanning optical apparatus according to the invention, said scanning optical means includes refractive optical elements all of which are scanning optical elements made of a resin.

In further aspect of the scanning optical apparatus according to the invention, said scanning optical means includes a scanning optical element made of glass.

In further aspect of the scanning optical apparatus according to the invention, said scanning optical means includes a reflecting optical element having a power.

In further aspect of the scanning optical apparatus according to the invention, said setting means sets the polarization angle difference between the light beams emitted from the plurality of light emitting portions to be not more than 20°.

In further aspect of the scanning optical apparatus according to the invention, said setting means comprises correction means for correcting the polarization angle difference between the plurality of light beams incident on said scanning optical element made of the resin.

In further aspect of the scanning optical apparatus according to the invention, said correction means comprises polarized light limiting means inserted into an optical path between the light source means and said scanning optical element made of the resin.

In further aspect of the scanning optical apparatus according to the invention, said polarized light limiting means is tilted with respect to the optical axis of said incident optical means.

In further aspect of the scanning optical apparatus according to the invention, the plurality of light emitting portions are independently arranged.

In further aspect of the scanning optical apparatus according to the invention, said setting means comprises adjustment means capable of independently adjusting polarization angles of the light beams emitted from the plurality of light emitting portions.

In further aspect of the scanning optical apparatus according to the invention, the light source means comprises a monolithic multi-beam light source.

In further aspect of the scanning optical apparatus according to the invention, said apparatus has a plurality of monolithic multi-beam light sources.

In further aspect of the scanning optical apparatus according to the invention, said setting means comprises adjustment means capable of independently adjusting polarization angles of the light beams emitted from the plurality of monolithic multi-beam light sources.

In further aspect of the scanning optical apparatus according to the invention, said setting means comprises a scanning optical element made of a resin, which is shift-decentered perpendicularly to a sub scanning direction and/or rotary-decentered about the main scanning direction.

In further aspect of the scanning optical apparatus according to the invention, letting h be a sub-scanning width of said scanning optical element made of the resin and d be an optical-axis-direction width, $h/d \leq 1.8$ is satisfied.

In further aspect of the scanning optical apparatus according to the invention, letting h be a sub-scanning width of said scanning optical element made of the resin and t be a sub-scanning width of the light beam passing through said scanning optical element made of the resin, $h/t \leq 15$ is satisfied.

In further aspect of the invention, there is provided an image forming apparatus comprising:
  said multi-beam scanning optical apparatus set out in the foregoing;
  a photosensitive member disposed in the scanning surface;
  a developer for developing, as a toner image, an electrostatic latent image formed on said photosensitive member by light beams scanned by said multi-beam scanning optical apparatus;
  a transfer device for transferring the developed toner image onto a transfer member; and
  a fixing device for fixing the transferred toner image on the transfer member.

In further aspect of the invention, there is provided an image forming apparatus comprising:
  said multi-beam scanning optical apparatus set out in the foregoing; and
  a printer controller for converting code data received from an external device into an image signal and inputting the image signal to said scanning optical apparatus.

DETAILED DESCRIPTION OF THE PREFERRED EMBODIMENTS

In an image forming apparatus, generally, if the interval between scanning lines in the sub scanning direction changes depending on the position due to various reasons, the printed image quality degrades. Especially, this phenomenon readily takes place in a multi-beam scanning optical apparatus having a plurality of light emitting portions because of the presence of the plurality of light emitting portions.

Causes for this phenomenon are:

(1) The optical surface (optical system) has not been so manufactured as to agree with design value.

(2) The magnification in the sub scanning direction (sub-scanning magnification) of the scanning optical means is not constant with respect to the main scanning direction.

(3) A light beam is not perpendicularly incident on a photosensitive drum surface.

In addition, the interval between scanning lines in the sub scanning direction also changes when light beams emitted from the plurality of light emitting portions have different polarization angles.

Many scanning optical apparatuses use an optical element (plastic lens) made of resin as a scanning optical means for the sake of cost and surface shape processing. Since an optical element made of a resin generally tends to have birefringence, the refractive index of such optical element made of a resin changes depending on the polarization direction of the incident beam. When a light beam is incident on such an optical element, the light beam is split into two light beams whose polarization directions are perpendicular to each other. The two light beams propagate through the lens and are synthesized after emerging from the lens. In this specification, the two polarization directions perpendicular to each other will be referred to as principal axes.

Figure 16:
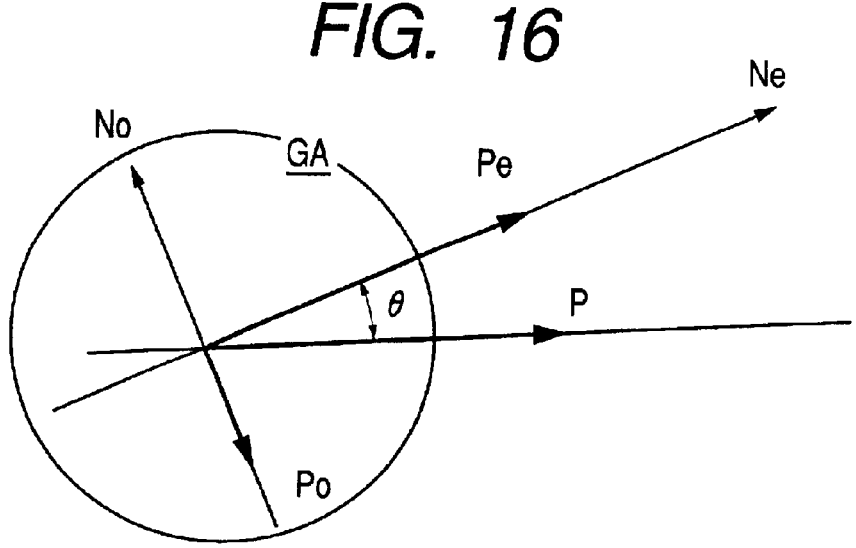
FIG. 16 is a view showing the relationship between a principal axis and a polarization direction P of an incident beam.

Let P be the polarization direction of an incident beam when a light beam La (not shown) is incident on an optical element GA from a direction perpendicular to the sheet surface, as shown in FIG. 16, No and Ne be the principal axes of birefringence of the optical element GA, and θ be the angle made by the polarization direction P of the incident beam La and the principal axis Ne of birefringence. In this case, the light beam is split into two polarized light components, i.e., a polarized light component Po in the No direction and a polarized light component Pe in the Ne direction, in the optical element GA. The polarized light components Po and Pe propagate in accordance with their refractive indices. For this reason, a phase difference is generated between the polarized light components, and the linearly polarized light beam changes to elliptically polarized light or the like.

The polarized light components Po and Pe are given by Po=P·sin θ and Pe=P·cosθ, respectively. The intensity of each of the polarized light components Po and Pe is proportional to its square.

In a scanning optical apparatus, a light beam deflected by deflection means passes through scanning optical means (f-θ optical system) while moving in the main scanning direction and changing its position. Scanning optical means often uses, e.g., a molded optical element for the purpose of cost reduction. Such an optical element has birefringence that changes depending on position due to a temperature distribution and stress distribution which are generated in a mold upon cooling, as will be described with reference to FIGS. 17, 18, 19A, and 19B.

Especially, molding using a resin material is advantageous in terms of cost but readily causes birefringence. In a lens which is molded by cooling for a time as short as 5 min, the directions of principal axes of birefringence largely change depending on the position in the lens.

Figure 33:
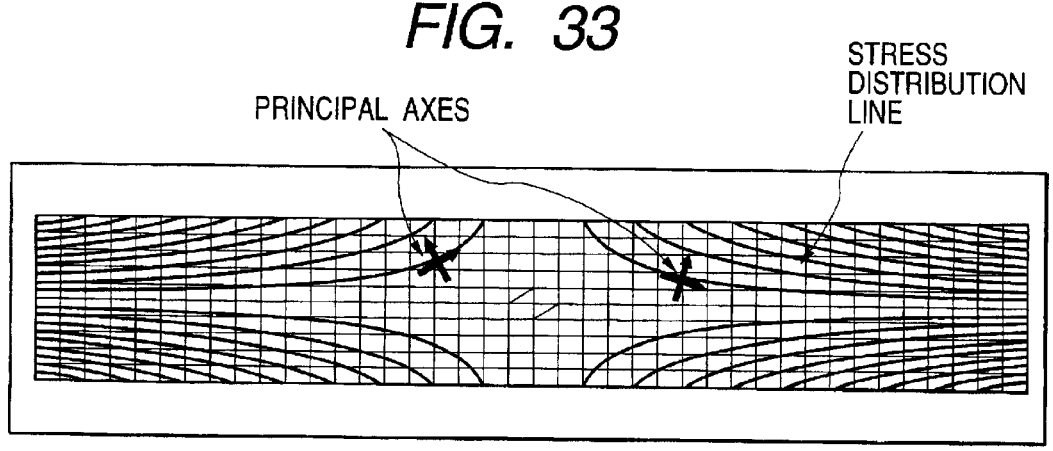
FIG. 33 is an explanatory view showing the relationship between the principal axes of birefringence and a stress distribution generated in a resin lens.

FIG. 33 is a plan view showing the optical element (lens) GA used in scanning optical means, which is viewed from the direction of an optical axis OA. FIG. 33 shows the stress distribution in the lens. Internal stress acts in a direction perpendicular to curves shown in FIG. 33. The principal axes of birefringence are directed in the horizontal and vertical directions with respect to the curves.

Figure 17:
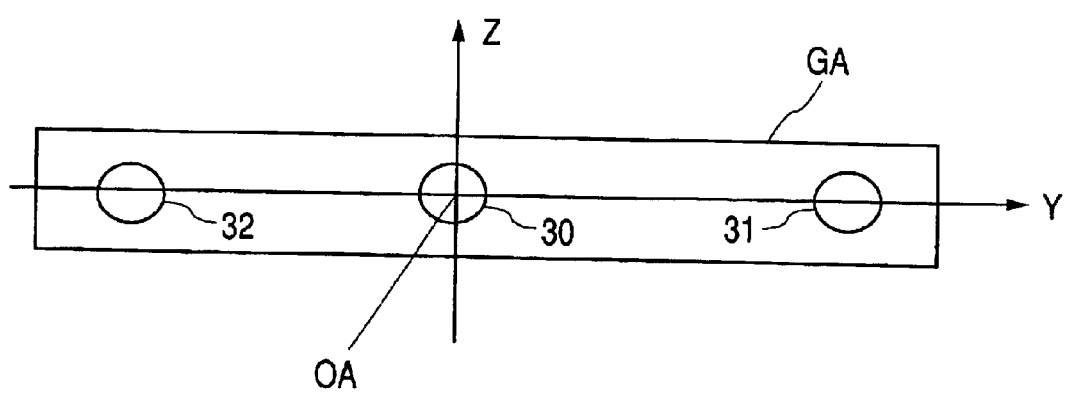
FIG. 17 is a front view of an optical element.
Figure 18:
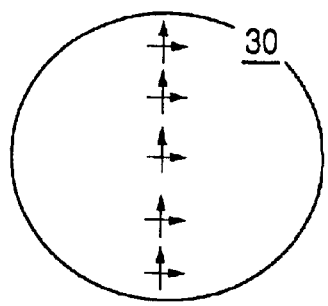
FIG. 18 is a view showing a principal axis distribution at the central portion of a lens.
Figure 19A:
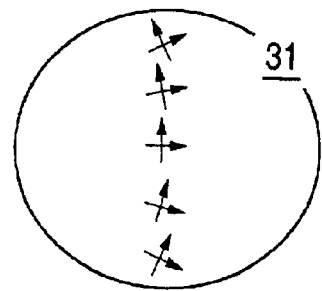
FIGS. 19A and 19B are views showing principal axis distributions at lens end portions.
Figure 19B:
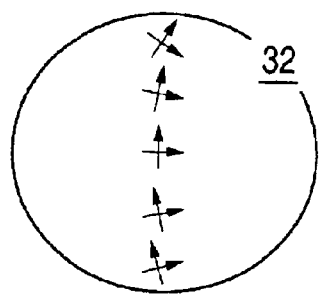

FIG. 17 is a plan view of the optical element (lens) GA used in the scanning optical means when viewed from the direction of the optical axis OA. Referring to FIG. 17, a light beam 30 passes through a region at the central portion of the lens, a light beam 31 passes through a region at one lens end portion, and a light beam 32 passes through a region at the other lens end portion. FIGS. 18, 19A and 19B are views showing the directions of principal axes of birefringence of the optical element in the light beams 30, 31, and 32 on an optical element 6A shown in FIG. 17, respectively.

Figure 20A:
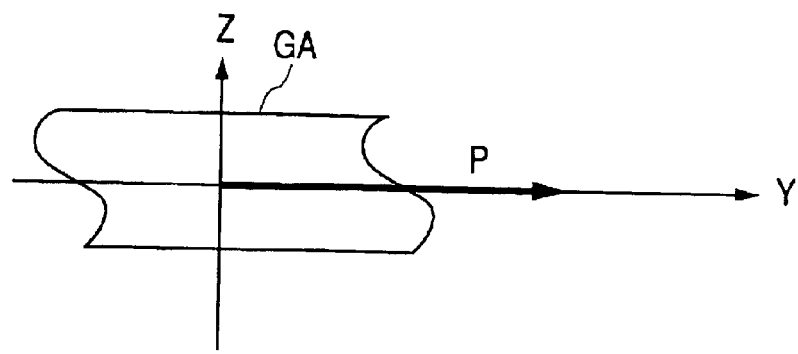
FIGS. 20A and 20B are views showing polarization directions of an incident beam.
Figure 21:
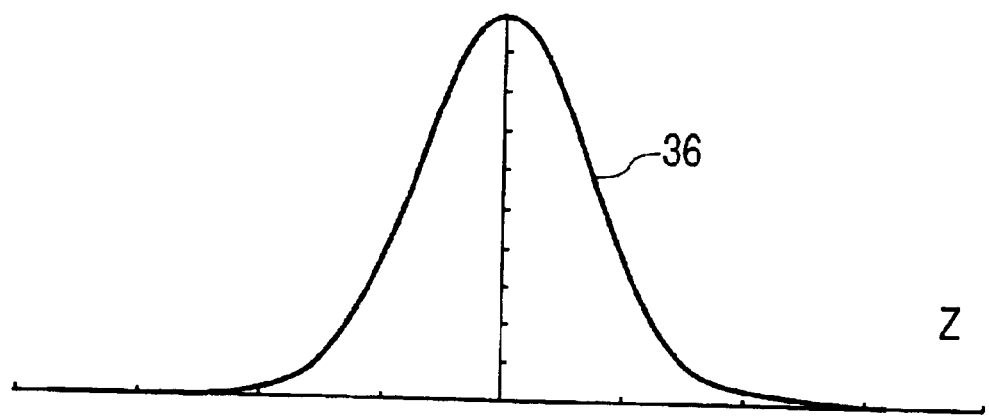
FIG. 21 is a view showing the ideal intensity distribution in a spot.
Figure 22:
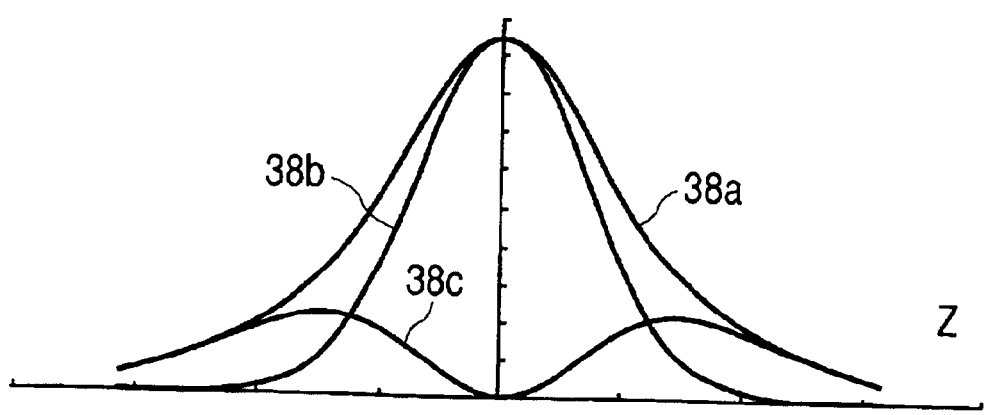
FIG. 22 is a view showing the intensity distribution in a spot of an end light beam.

As shown in FIGS. 18, 19A, and 19B, the directions of principal axes of birefringence change depending on position in the lens. This is because the directions of the principal axes of birefringence are affected by the temperature distribution that is generated upon cooling during molding. For example, the directions of principal axes in the section of the light beam 30 passing through the central portion of the lens almost match the long axis (main scanning direction) and short axis (sub scanning direction) of the lens because of the symmetry in the vertical and horizontal direction of the lens, as shown in FIG. 18. At this time, if the polarization direction of the incident beam La which is incident on the optical element GA matches a long axis Y or short axis Z, as shown in FIG. 20A, the angle made by the polarization direction P of the incident beam and the principal axis is almost 0° or 90°, and polarized light components in different directions are hardly generated in the lens. Hence, a spot on the scanning surface obtained at this time has an almost ideal intensity distribution indicated by a curve 36 in FIG. 21. Referring to FIG. 21, the abscissa represents the sub scanning direction, and the ordinate represents the intensity distribution of a formed spot. This relationship between the ordinate and the abscissa also applies to FIGS. 22, 23, and 24 to be described later.

Figure 20B:
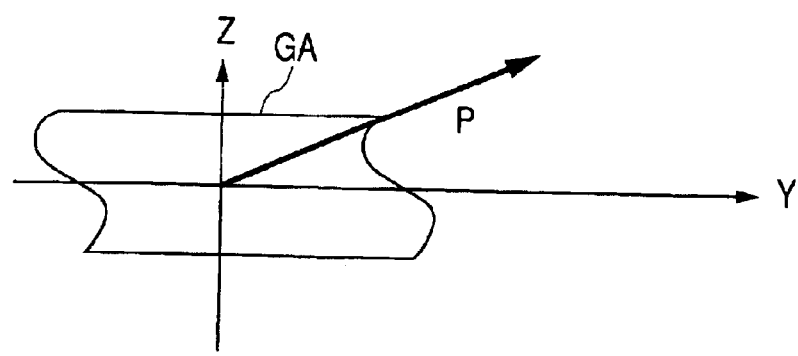

To the contrary, for example, when the polarization direction P of the incident beam La passing through the central portion of the lens is tilted with respect to the long axis Y or short axis Z, as shown in FIG. 20B, a polarized light component in a different direction is generated in accordance with the tilt. In this case, since the angle θ made by the polarization direction P and principal axis rarely changes in the entire region of the light beam, an almost uniform phase difference is generated in the light beam. Hence, a finally obtained spot has an almost ideal intensity distribution like the curve 36 shown in FIG. 21, as in the case wherein the polarization direction P of the incident beam matches the long axis or short axis of the lens.

Figure 29:
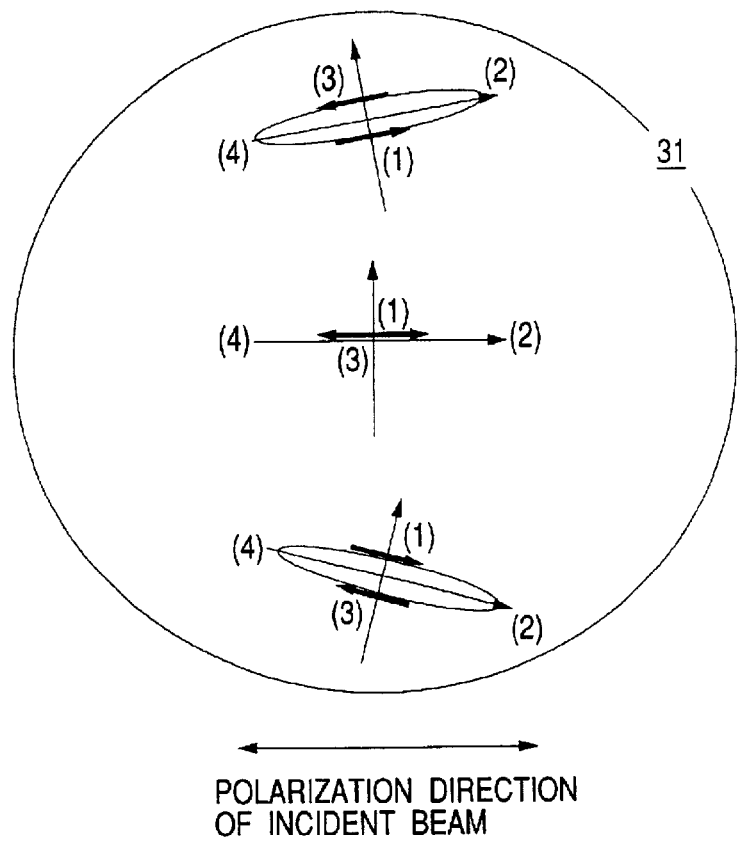
FIG. 29 is a view showing the polarization direction of a portion of the light beam after passing through a resin lens.

However, the tilts of principal axes in the section of the light beam 31 that passes through the lens end portion have a distribution asymmetric in the vertical direction, as shown in FIG. 19A. In this case, the tilts of the principal axes change depending on position within the light beam, and the tilts of the principal axes become larger away from the central portion toward the end portion of the lens. As a result, even when the incident beam La that becomes incident on the optical element GA has the polarization direction P in the direction of the long axis Y or short axis Z of the lens, as shown in FIG. 20A, a polarized light component different from that of the incident beam appears in the light beam propagating through the lens, and the amount of the polarized light component changes depending on position in the light beam. FIG. 29 shows the polarized state of the light beam after passing through the lens end portion.

Referring to FIG. 29, three sets of arrows perpendicular to each other indicate principal axes, as in FIGS. 19A and 19B, and two ellipses on the upper and lower sides and the horizontal line at the center indicate the polarized states of the light beam after passing through the lens. Arrows on the ellipses indicates the rotation directions of polarized light. Referring to FIG. 29, the light component transmitted through the central portion emerges in the same polarized state as that of the incident beam because the polarization direction of the incident beam matches the direction of the principal axis. On the other hand, the light components transmitted through the upper and lower portions are converted from linearly polarized light to elliptically polarized light, as shown in FIG. 29, because the polarization direction of the incident beam does not match the direction of the principal axis.

The polarized light components exhibit rotation directions as shown in FIG. 29. This will be described below in detail.

Figure 31A:
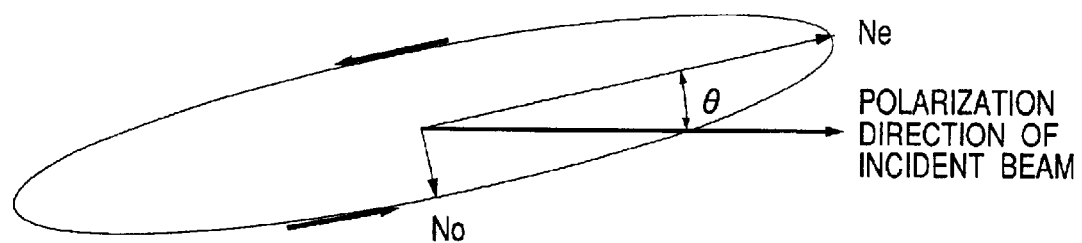
FIGS. 31A and 31B are views each showing the relationship between the polarization directions of the incident and exit light beams and the principal axis.
Figure 31B:
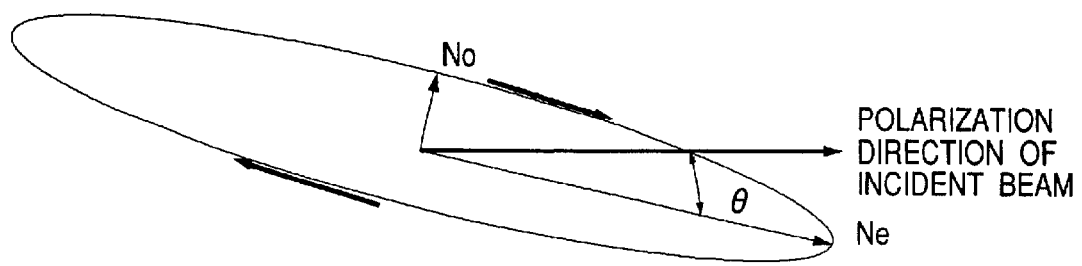

FIGS. 31A and 31B are views showing the relationship between the polarization direction of an incident beam, principal axes, and the polarization direction of an exit beam. FIG. 31A shows a light component at the upper portion of the light beam, and FIG. 31B shows a light component at the lower portion of the light beam. The light beam that becomes incident on the lens is split into two light beams in accordance with the directions of principal axes. Referring to FIGS. 31A and 31B, the light beam is split into light beams having polarized light components in the Ne and Ne directions. As the split light beams pass through a lens having birefringence, the phase of the polarized light component in the Ne direction shifts from that of the polarized light component in the No direction. Consequently, the light beam synthesized after emerging from the lens is converted from linearly polarized light to elliptically polarized light. Assuming that the phase of the polarized light component in the Ne direction is delayed from that in the No direction by $\pi/4$, elliptically polarized light having a rotation direction as shown in FIG. 31A or 31B is obtained.

At this time, since the directions of tilt of principal axes are reversed with respect to the center, the rotation direction of polarized light is also reversed with respect to the center.

The rotation and vibration of each polarized light component in the light beam are not disorderly. When the polarized light component at the upper portion of the light beam indicates direction (1) in FIG. 32, each of the polarized light components at the center and lower portion of the light beam indicates its direction (1). When the polarized light component at the upper portion indicates directions (2), (3), and (4) in FIG. 32, each of the polarized light components at the center and lower portion of the light beam indicates its directions (2), (3), and (4), respectively. For a polarization distribution in such a light beam at an arbitrary timing, the polarized light component in the horizontal direction in FIG. 29, which matches the polarization direction of the incident beam, is directed to the same direction independently of the position in the light beam. On the other hand, the components on the upper and lower sides in FIG. 29, which are perpendicular to the polarization direction of the incident beam, are directed in opposite directions with respect to the central portion.

Figure 30A:
FIGS. 30A, 30B and 30C are views each showing the polarization direction of a portion of the light beam.
Figure 30B:
Figure 30C:
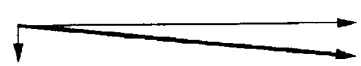

FIGS. 30A to 30C are views showing the polarization directions of emerging beams at the respective positions at timing (2) in FIG. 29.

The set of arrows in FIG. 30A indicates the polarization direction at the upper portion of the emerging beam, and its horizontal and vertical components with respect to the polarization direction of the incident beam. The sets of arrows in FIGS. 30B and 30C indicate the polarization directions at the respective positions in the exit beam, and its horizontal and vertical components with respect to the polarization directions of the incident beam.

As described above, all components in the direction (horizontal direction) parallel to the polarization direction of the incident beam are directed in the same direction, while components in the direction (vertical direction) perpendicular to the polarization direction of the incident beam are directed in opposite directions with respect to the central portion, as shown in FIG. 30A and FIG. 30C.

Figure 27:
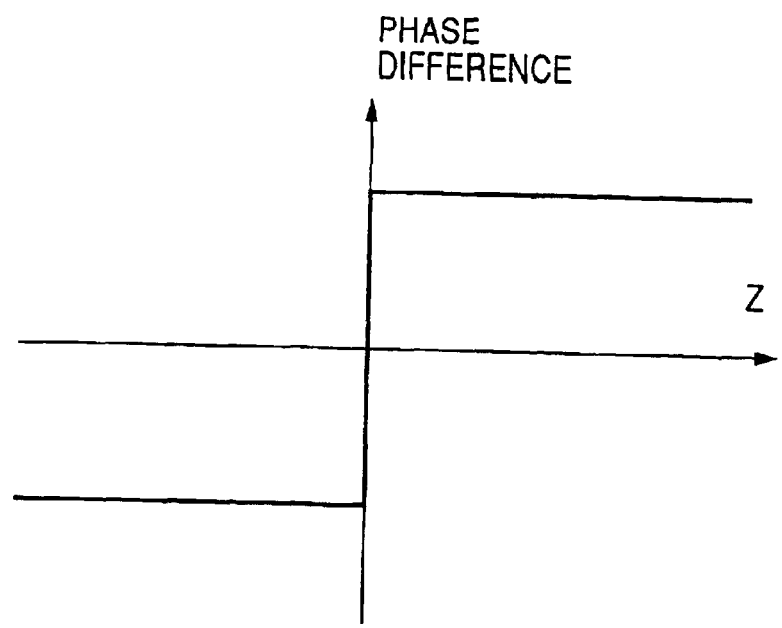
FIG. 27 is a view showing the phase distribution between light beams.

When such a state of components perpendicular to the polarization direction of the incident beam is expressed by the form of a phase difference distribution, the light beam has a phase difference distribution as shown in FIG. 27. Referring to FIG. 27, the abscissa represents the vertical direction (Z direction) of the lens GA, and the ordinate represents the phase difference of polarized light perpendicular to the polarization direction of the incident beam with respect to the phase at the center of the light beam 31.

A light beam whose components are in phase forms one spot image, but a light beam whose components have inverted phases forms a plurality of spot images, as is known. As described above, the phase of a component perpendicular to the polarization direction of the incident beam passing through a lens end portion is inverted with respect to the center in the sub scanning direction. As a result, a polarized light component perpendicular to the polarization direction P of the incident beam forms a spot image having an intensity distribution with two peaks indicated by a curve 38c in FIG. 22 on the scanning surface. On the other hand, since a polarized light component parallel to the polarization direction P of the incident beam has a uniform phase in the light beam, the spot formed on the scanning surface is a normal spot having an intensity distribution indicated by a curve 38b in FIG. 22. The two polarized light components are perpendicular to each other and therefore do not interfere with each other. Hence, a finally obtained spot is an enlarged spot indicated by a curve 38a obtained by superposing the two curves 38b and 38c shown in FIG. 22.

Figure 28:
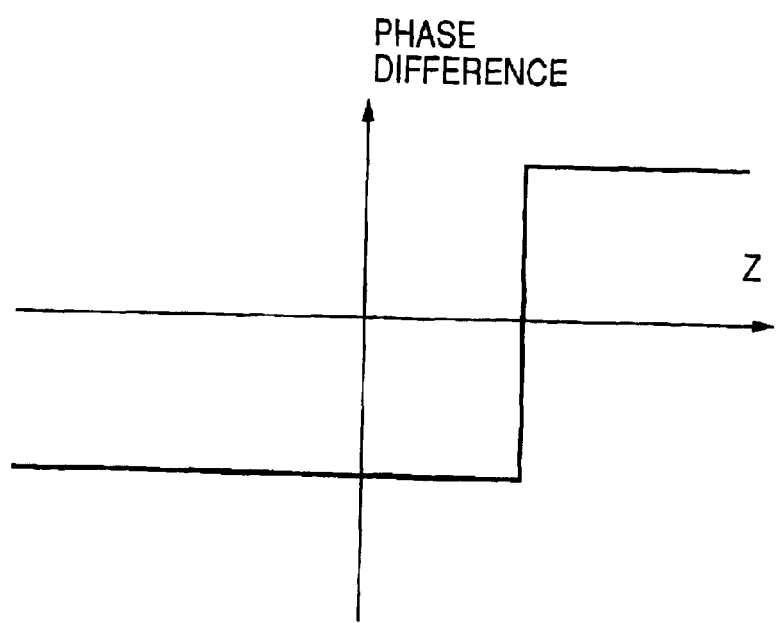
FIG. 28 is a view showing the phase distribution between light beams.

When the polarization direction P of the incident beam La is tilted with respect to the long axis Y or short axis Z of the optical element GA, as shown in FIG. 20B, the polarization direction P of the incident beam does not match the direction of the principal axis even at the center of the light beam La. For this reason, the light beam has a phase difference distribution shown in FIG. 28. Referring to FIG. 28, the abscissa represents the vertical direction (Z direction) of the lens GA, and the ordinate represents the phase difference of polarized light perpendicular to the polarization direction of the incident beam.

Referring to FIG. 28, the phase difference is inverted at a position separated from the center, unlike FIG. 27. This is because the polarization direction P of the incident beam is tilted as mentioned above, and therefore, the polarization direction P of the light beam matches the direction of the principal axis at the position separated from the center. Because of the influence of deviation of phase inversion position from the center, the polarized light component perpendicular to the polarization direction P of the incident beam forms, on the scanning surface, a spot having an intensity distribution with two peaks deviated from the center, as indicated by a curve 39c in FIG. 23.

Figure 23:
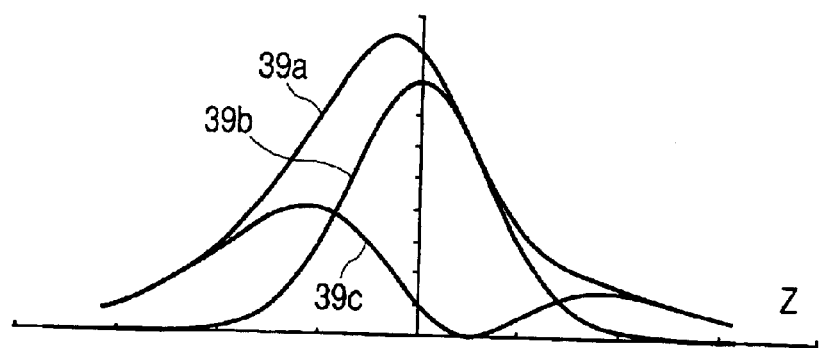
FIG. 23 is a view showing the intensity distribution in a spot when the polarization direction is tilted.

On the other hand, a component parallel to the polarization direction P of the incident beam has a uniform phase in the light beam, as before the incident beam is tilted, and therefore forms, on the scanning surface, a normal spot having an intensity distribution indicated by a curve 39b in FIG. 23. The two polarized light components are perpendicular to each other and therefore do not interfere with each other. Hence, a finally obtained spot is an enlarged spot deviated to the left side (the lower side of the lens), as indicated by a curve 39a obtained by superposing the two curves 39b and 39c shown in FIG. 23.

At the other end, since the principal axes have tilts reverse to those in FIG. 19A, as shown in FIG. 19B, the spot finally obtained on the scanning surface is an enlarged spot deviated to the right side (the upper side of the lens), unlike the curve 39a shown in FIG. 23.

Figure 24:
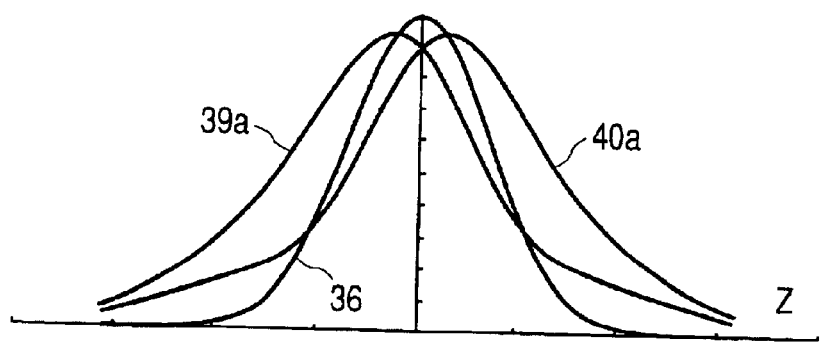
FIG. 24 is a view showing the transition of the intensity distribution in a spot when the polarization direction is tilted.
Figure 25:
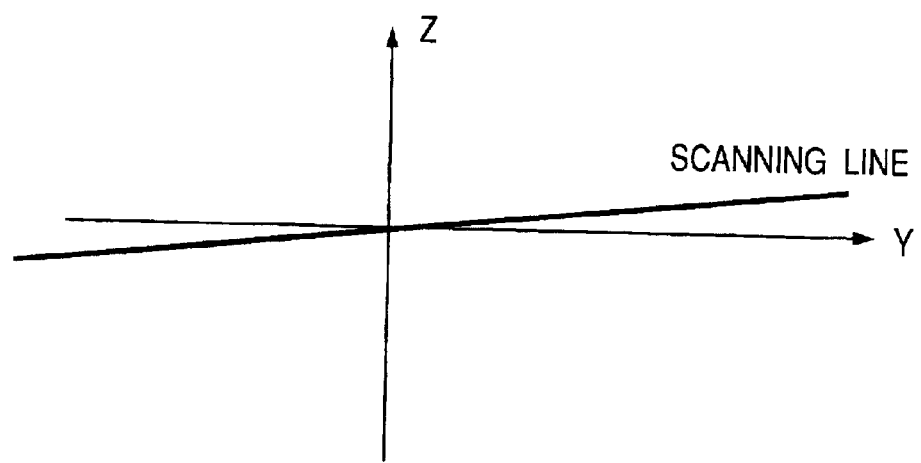
FIG. 25 is a view showing a tilt of a scanning line.

If the polarization direction P of the incident beam does not match the long axis or short axis of the lens, the peak position of the intensity distribution of a spot on the scanning surface moves, as shown in FIG. 24, as the light beam changes its transmission position on the lens, and a scanning line finally obtained on the scanning surface is tilted, as shown in FIG. 25.

Figure 26A:
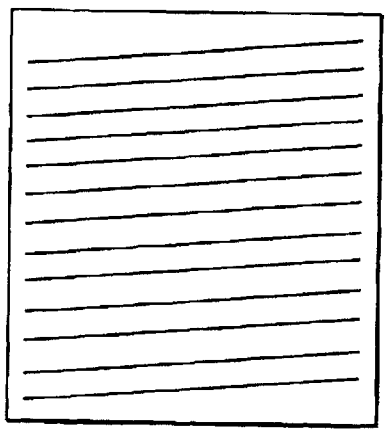
FIGS. 26A, 26B, 26C, 26D and 26E are explanatory views showing tilts of scanning lines when a single light emitting portion or two light emitting portions are present.

When only one light emitting portion is present, all scanning lines on a scanning surface SP are tilted in the same way in the effective scanning region, as shown in FIG. 26A. For this reason, the influence on the printing quality is relatively small. However, when a plurality of light emitting portions are present, and they have no uniform polarization direction P, scanning lines on the scanning surface SP are tilted in various ways in the effective scanning region, as shown in FIGS. 26B to 26E, resulting in degradation in printing quality.

FIGS. 26B to 26E show examples with two light emitting portions in a scanning optical apparatus. A scanning line formed by a light beam emitted from one light emitting portion A is defined as line A, and a scanning line formed by a light beam emitted from the other light emitting portion B is defined as line B. The tilts of scanning lines on the scanning surface are shown in correspondence with the polarization directions P of the light emitting portions A and B.

Figure 26B:
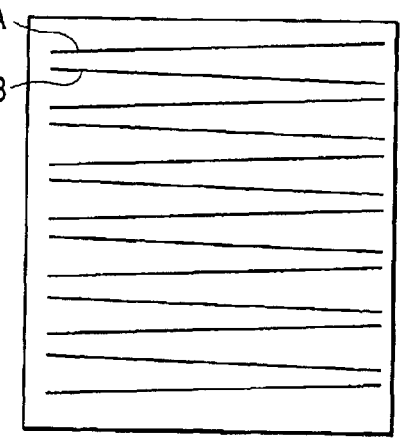
Figure 26C:
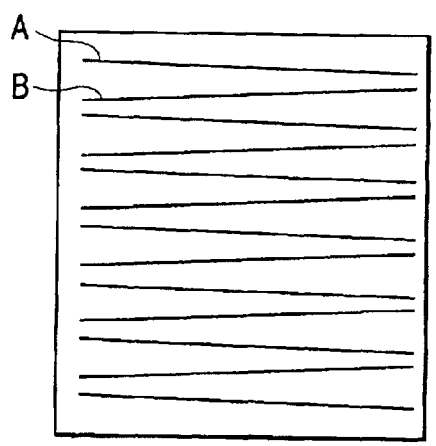
Figure 26D:
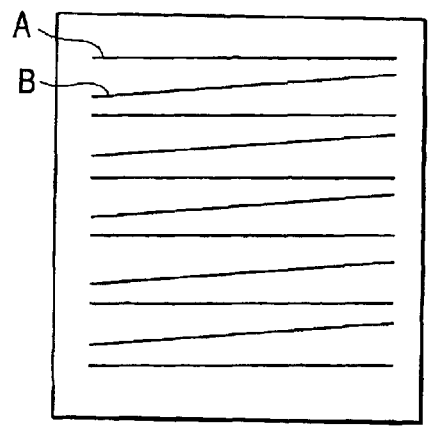
Figure 26E:
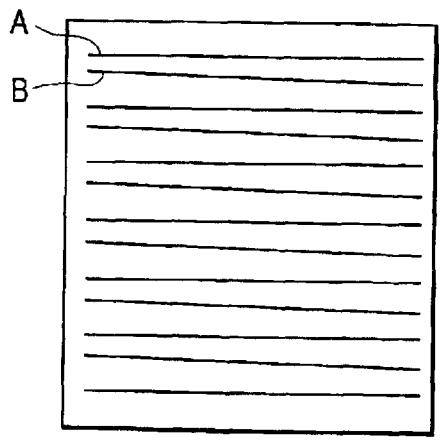

Referring to FIGS. 26B to 26E, the interval between the adjacent scanning lines A and B of the scanning lines formed on the scanning surface changes in the main scanning direction in the effective scanning region. The sub-scanning interval between the adjacent scanning lines A and B at the left end is different from that at the right end, resulting in degradation in printing quality. Referring to FIGS. 26B and 26E, the sub-scanning interval between the adjacent scanning lines A and B monotonically increases in the sub scanning direction from the left to the right. Conversely, referring to FIGS. 26C and 26D, the interval monotonically decreases.

Figure 34A:
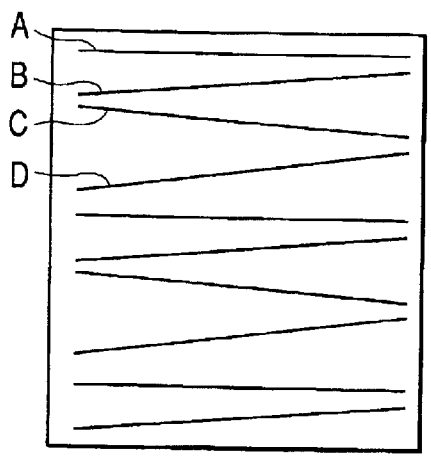
FIGS. 34A and 34B are explanatory views showing tilts of scanning lines when four light emitting portions are present.
Figure 34B:
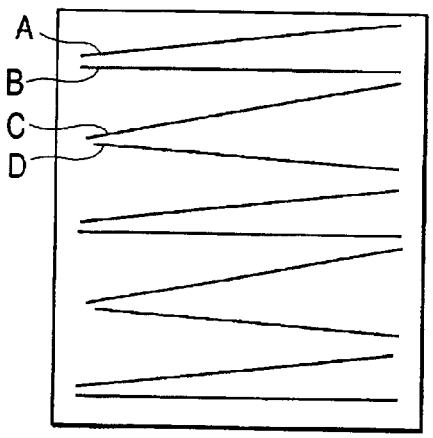

FIGS. 34A and 34B show examples using four light emitting portions in a scanning optical apparatus. The light emitting portions are sequentially arranged in one direction, for which a scanning line formed by a light beam emitted from a first light emitting portion A is defined as line A, a scanning line formed by a light beam emitted from a second light emitting portion B is defined as line B, a scanning line formed by a light beam emitted from a third light emitting portion C is defined as line C, and a scanning line formed by a light beam emitted from a fourth light emitting portion D is defined as line D. The tilts of scanning lines on the scanning surface are shown in correspondence with the polarization directions P of the light emitting portions A, B, C, and D.

In the above-description, the light emitting portions have almost the same polarization direction. The above-described scanning line interval error still occurs when the polarization directions of light emitting portions are almost perpendicular to each other.

Figure 32:
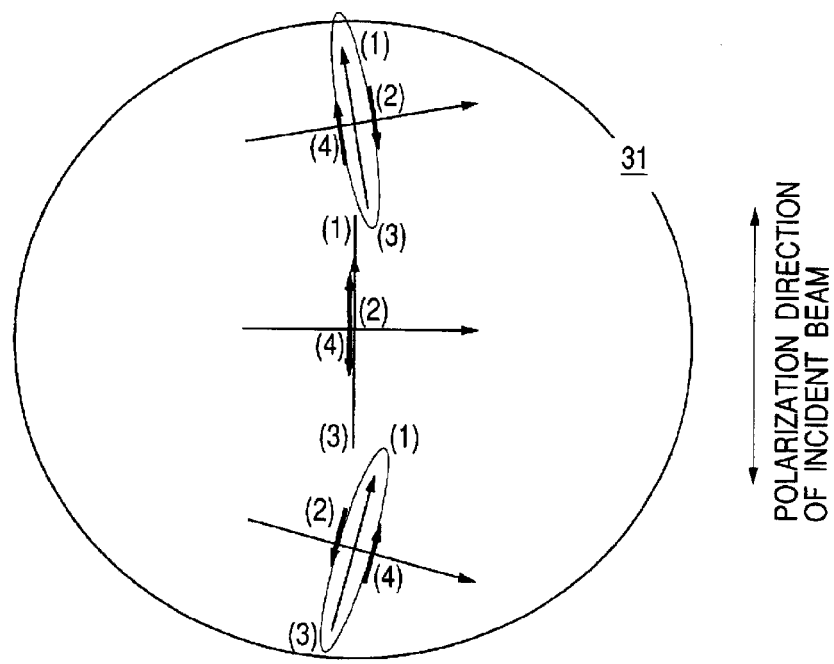
FIG. 32 is a view showing the polarization direction of a portion of the light beam after passing through a resin lens.

FIG. 32 shows the polarized state of the light beam 31 shown in FIG. 17 after passing through the lens, as in FIG. 29. FIG. 32 is different from FIG. 29 in that the polarization direction of an incident beam is directed in the vertical direction in FIG. 32. The meanings of arrows are the same as in FIG. 29.

Referring to FIG. 32, the light component transmitted through the central portion emerges in the same polarized state as that of the incident beam because the polarization direction of the incident beam matches the direction of the principal axis. On the other hand, the light components transmitted through the upper and lower portions are converted from linearly polarized light to elliptically polarized light, as shown in FIG. 32, because the polarization direction of the incident beam in the respective portions does not match the direction of the principal axis.

As shown in FIG. 32, the directions of polarized light components parallel to the polarization direction of the incident beam always match independently of the position in the light beam. However, components perpendicular to the polarization direction of the incident beam are always directed in opposite directions at the upper and lower portions of the light beam. Since the components perpendicular to the polarization direction of the incident beam form two spots on the imaging plane, a finally obtained spot is an enlarged spot superposed on the spot formed by the polarized light components parallel to the polarization direction of the incident beam.

When the polarization directions of light beams in light emitting portions are strictly perpendicular to each other, the spot of each light emitting portion is enlarged even during deflection and scanning. This is because the directions of two principal axes are always perpendicular to each other. For this reason, the above description can be applied when what has been handled as a polarization angle difference is handled as a shift angle from a parallel or orthogonal state. When the polarization direction is shifted from a horizontal or vertical state, the state of a spot changes for each light emitting portion. For this reason, a printing state as shown in, e.g., FIG. 26B is obtained, resulting in degradation in printing quality.

To measure the direction of a principal axis, a light source for emitting linearly polarized light and a polarizer are used. A polarizing plate is irradiated with light having linear polarization, and the polarizing plate or light source is rotated and adjusted such that the amount of light emerging from the polarizing plate is maximized. Next, a sample whose principal axis direction is to be measured is placed between the light source and the polarizing plate and rotated about the optical axis to detect an angle at which the light amount is maximized. The angle obtained at this time indicates the direction of the principal axis. Alternatively, an angle relationship with which the light amount is minimized may be set between the light source and the polarizing plate, and after insertion of a sample, an angle at which the light amount is minimized may be detected.

<First Embodiment>

Figure 1:
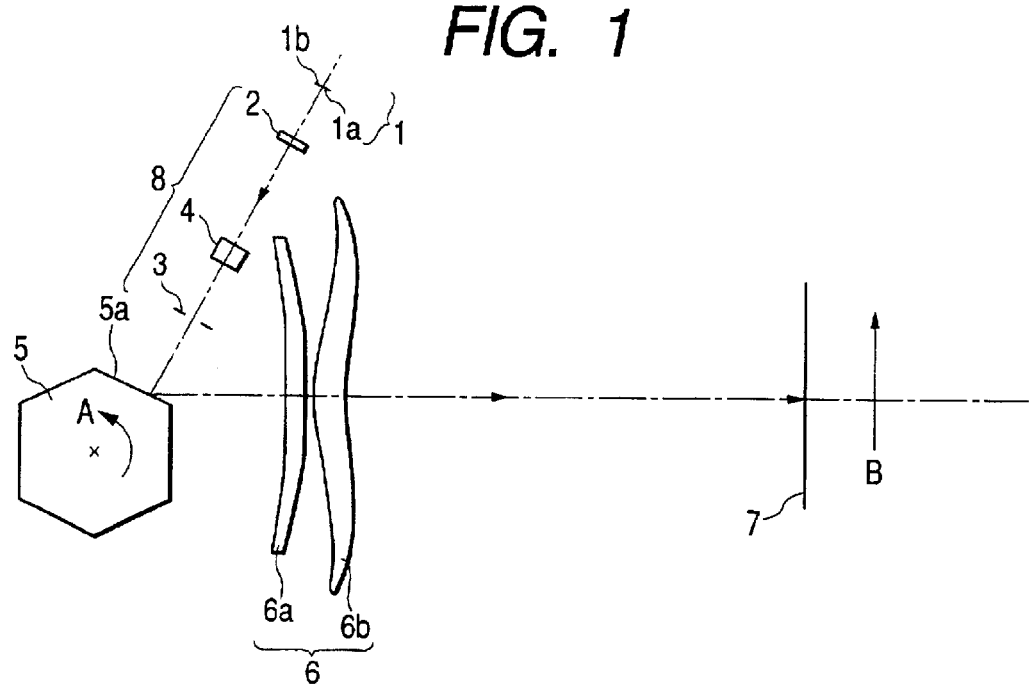
FIG. 1 is a sectional view showing the main part in the main scanning direction in the first embodiment of the present invention.
Figure 2:
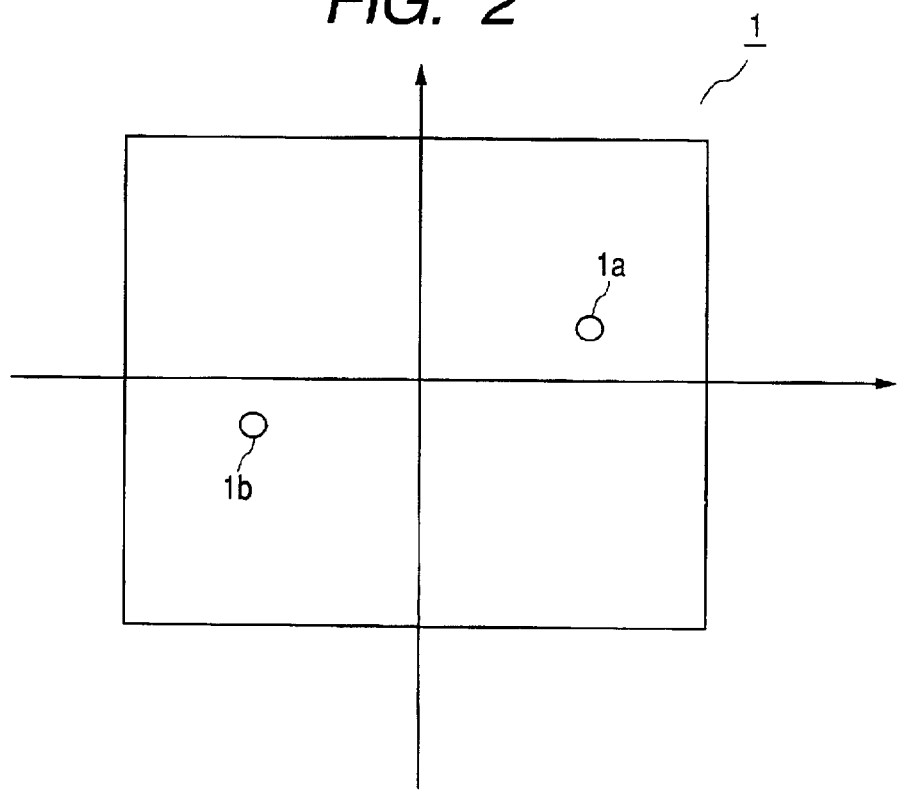
FIG. 2 is a view showing the layout of light emitting portions in the first embodiment of the present invention.

FIG. 1 is a sectional view (main-scanning sectional view) showing the main part in the main scanning direction of an optical scanning apparatus according to the first embodiment of the present invention. FIG. 2 is a sectional view (sub-scanning sectional view) showing the main part of the light source means shown in FIG. 1.

In this specification, a direction in which a light beam is reflected and deflected (deflected and scanned) by deflection means is defined as the main scanning direction, and a direction perpendicular to the optical axis of the scanning optical means and the main scanning direction is defined as the sub scanning direction.

Referring to FIG. 1, light source means 1 comprises, e.g., a monolithic multi-beam semiconductor laser and has two, first and second light emitting portions 1a and 1b. The first and second light emitting portions 1a and 1b are separated by a predetermined distance in the main scanning and sub scanning directions, as shown in FIG. 2. A collimator lens 2 converts two divergent light beams emitted from the light source means 1 into almost parallel light beams. A cylindrical lens (cylinder lens) 4 has a predetermined refracting power only in the sub scanning direction so that the substantially parallel light beams transmitted through the collimator lens 2 are imaged as substantially linear images on a deflecting surface 5a of an optical deflector 5 (to be described later) in the sub-scanning section. An aperture stop 3 shapes the light beams emerging from the cylindrical lens 4 into a desired optimum beam shape. In this embodiment, the aperture stop 3 is arranged near the deflecting surface 5a of the optical deflector 5 (to be described later) to reduce a deviation in printing position of each light beam in the main scanning direction.

Each of the collimator lens 2, cylindrical lens 4, and aperture stop 3 constitutes an element of incident optical means 8.

The optical deflector 5 serving as a deflection means comprises, e.g., a polygon mirror (rotary polyhedral mirror). The optical deflector 5 is rotated in a direction indicated by an arrow A in FIG. 1 at a predetermined speed by drive means (not shown) such as a motor.

A scanning optical means (f-θ lens system) 6 having an f-θ characteristic has two, first and second optical elements (toric lenses) 6a and 6b made of a resin (plastic) molded by the injection molding and forms images of two light beams based on image information deflected by the optical deflector 5 on a photosensitive drum surface 7. The scanning optical means has a correction function for correcting a surface inclination of the optical deflector 5 by making the deflecting surface 5a of the optical deflector 5 and the photosensitive drum surface 7 optically conjugate each other in the sub-scanning section.

The photosensitive drum surface 7 serves as a surface to be scanned (scanning surface).

In this embodiment, the two divergent light beams emitted from the monolithic multi-beam semiconductor laser 1 are converted into substantially parallel light beams by the collimator lens 2 and become incident on the cylindrical lens 4. In the main-scanning section, the two substantially parallel light beams incident on the cylindrical lens 4 emerge while being kept unchanged and pass through the aperture stop 3 (the light beams are partially shielded). In the sub-scanning section, the light beams converge and pass through the aperture stop 3 (the light beams are partially shielded) and form substantially linear images (linear images long in the main scanning direction) on the deflecting surface 5a of the optical deflector 5. The two light beams deflected by the deflecting surface 5a of the optical deflector 5 are guided onto the photosensitive drum surface 7 through the first and second optical elements 6a and 6b to optically scan the photosensitive drum surface 7 in a direction indicated by an arrow B as the optical deflector 5 is rotated in the direction of an arrow A. With this operation, an image is recorded on the photosensitive drum surface 7 serving as a recording medium.

In this embodiment, the sub-scanning magnification of the scanning optical means 6 is set to be almost uniform for the entire scanning range such that the sub-scanning interval between scanning lines becomes almost constant in an ideal situation.

In this embodiment, the two divergent light beams emitted from the multi-beam semiconductor laser 1 are converted into substantially parallel light beams by the collimator lens 2. The effect of the present invention to be described below can also be obtained even when the light beams are converted into convergent light beams or divergent light beams.

In this embodiment, to facilitate manufacturing and reduce cost, the first and second optical elements 6a and 6b of the scanning optical means 6 are molded using a resin material "ZEONEX". For this reason, a principal axis distribution as shown in FIGS. 18, 19A, and 19B is present in each of the first and second optical elements 6a and 6b. Hence, as described in the foregoing, if light beams emerging from the first and second light emitting portions 1a and 1b have different polarization angles, the interval between scanning lines in the sub scanning direction is not constant, resulting in degradation in printing quality.

According to an experiment and examination by the present inventor, the relationship between the difference in polarization angle between the light beams emitted from the plurality of light emitting portions and the interval error between scanning lines in the sub scanning direction represented that the interval error between scanning lines on the scanning surface was about ±2.5 μm when the angle difference was 30°. Another experiment also revealed that an interval error of ⅕ or more the interval between original scanning lines considerably degraded the printing quality.

The sub-scanning resolution of the apparatus of this embodiment is about 1,200 dpi. Hence, an ideal interval between scanning lines is about 21 μm. The interval error is preferably at least ⅕ the interval between original scanning lines, i.e., ±4.2 μm or less.

For this purpose, in this embodiment, the polarization angle difference between the light beams emitted from the first and second light emitting portions 1a and 1b is set to be 45° or less in consideration of an interval error originally included in the design value and the decentration of an optical element such that the interval error between scanning lines in the sub scanning direction becomes ⅕ or less the desired interval between the scanning lines. With this arrangement, a multi-beam scanning optical apparatus which reduces the interval error between the scanning lines in the sub scanning direction and can perform high-quality high-speed printing at a relatively low cost is obtained.

In this embodiment, the polarization angle difference between the light beams emitted from the plurality of light emitting portions are set to be 45° or less. This angle difference is preferably 20° or less.

A lens molded using a resin material has birefringence, and the directions of principal axes of birefringence change depending on the position. Especially, an asymmetrical principal axis distribution is formed in the sub scanning direction, as shown in FIGS. 19A and 19B.

However, when a height (sub-scanning width) h of the resin lens is as large as 15 times or more of a sub-scanning width t of a light beam passing through the lens, the asymmetrical distribution of the principal axes of birefringence in the light beam becomes relatively small. To reduce the influence of birefringence, a lens having the above structure is preferably used. In fact, it is difficult for a lens used for a scanning optical means to satisfy h/t>15 because the cost may increase due to the material cost and longer molding time.

However, even when use of a lens that satisfies h/t≦15 makes the problem pointed out in this specification conspicuous, that problem can be solved by using the means described in this specification.

In this embodiment, for the deflection-means-side lens 6a used in the scanning optical means, h/t=22.3, i.e., the lens shape is preferable to reduce the influence of birefringence. However, for the lens 6b on the photosensitive drum surface 7 side, h/t=11.7. That is, the lens is readily affected by birefringence. However, the influence is reduced using the measures described above.

When the height (sub-scanning width) h of the scanning lens made of a resin is 1.8 times or more of a thickness (optical-axis-direction width) d of the optical element, heat dissipation occurs from the direction of thickness more than from direction of height in cooling of the molding process, and consequently, the lens is rapidly cooled and hardened. For this reason, the directions of principal axes of birefringence are fixed before the principal axes start largely tilting. Hence, the asymmetrical distribution of the principal axes in the sub scanning direction becomes small.

To reduce the influence of birefringence, a lens having the above structure is preferably used. In fact, if the thickness is too small, the resin cannot be smoothly supplied into the mold, resulting in occurrernce of birefringence. In addition, if the height (sub-scanning width) h of the lens is too large, the cost undesirably increases.

However, even when use of a lens that satisfies h/d≦1.8 makes the problem pointed out in this specification conspicuous, that problem can be solved by using the means described in this specification. In this embodiment, h/d=1.53 for the deflection-means-side lens 6a used in the scanning optical means, and h/d=1.63 for the lens 6b on the photosensitive drum surface 7 side, i.e., the lens shapes are readily affected by birefringence. However, the influence is reduced using the measures described above.

The reason why the influence of birefringence becomes serious when all lenses used for the scanning optical means are resin lenses having birefringence will be described below.

When the scanning optical means consists of a plurality of resin lenses having birefringence, the interval error due to the birefringence almost appears as an accumulation of influence of birefringence of each lens. This is due to the following reason. Since the distribution of tilts of principal axes of birefringence easily depends on the outer shape of a lens, and each lens used in the scanning optical means often has a rectangular shape because of the space, the directions of the tilts of the principal axes of birefringence at a position in the lens are the same for any lens more or less.

The influence of birefringence also depends on the direction of incidence of a light beam or the shape of a lens. For this reason, the interval error between scanning lines in the sub scanning direction does not strictly linearly change with respect to the main scanning direction. Hence, when a plurality of lenses having birefringence are used, a portion at which the interval error between scanning lines is locally increased by totaling positions with large interval errors may be formed. If such a portion is locally formed, that portion becomes very noticeable on a printed image, resulting in degradation in printing quality.

The influence of birefringence also depends on the thickness of a lens. Generally, as the thickness increases, the influence of birefringence more readily appears. Hence, even a single but thick resin lens having birefringence readily generates an interval error between scanning lines. Furthermore, when only a single lens is used for the scanning optical means, the lens tends to be thick to obtain an f-θ characteristic and the like. For this reason, if the single lens used for the scanning optical means is a resin lens having birefringence, the interval error between scanning lines is readily generated.

As described above, when all lenses used for the scanning optical means are resin lenses having birefringence, the influence of birefringence is large, and therefore, the interval error between scanning lines readily occurs. However, such a structure is often positively employed to make the cost consistent with the optical performance, though it would be proper to avoid such a structure. The effect of the present invention can be obtained especially in this case, and the degradation in printed image quality due to the interval error between scanning lines can be reduced by using the measures proposed in the present invention.

In this embodiment, both the two lenses of the scanning optical means are made of resin lenses having birefringence. However, the influence is reduced by using the measures described above.

<Second Embodiment>

Figure 3:
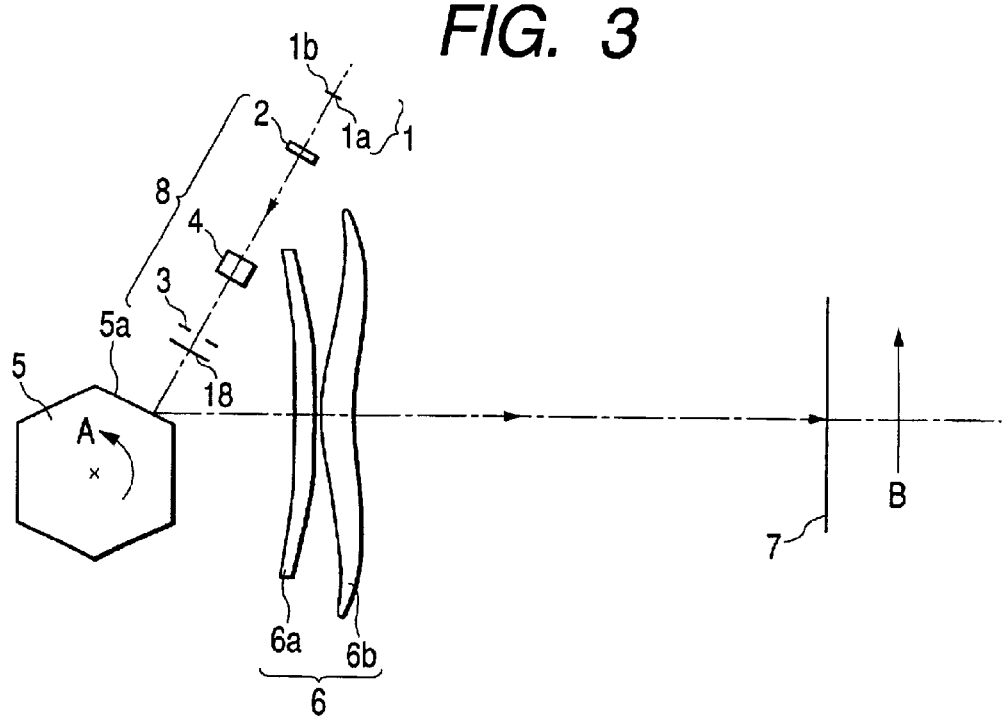
FIG. 3 is a sectional view showing the main part in the main scanning direction in the second embodiment of the present invention.

FIG. 3 is a sectional view (main-scanning sectional view) showing the main part in the main scanning direction in the second embodiment of the present invention. The same reference numerals as in FIG. 1 denote the same elements in FIG. 3.

The second embodiment is different from the above-described first embodiment in that, e.g., a polarizing plate 18 serving as a polarized light limiting means having a function of transmitting only a component in a specific polarization direction is arranged after an aperture stop 3 arranged rotatably about the optical axis. The remaining components and optical function are almost the same as in the first embodiment whereby the same effect as in the first embodiment is obtained.

That is, the polarized light limiting means 18 consists of, e.g., a polarizing plate having a function of transmitting only a light beam with a component in a specific polarization direction. The polarizing plate is inserted immediately after the aperture stop 3 while being tilted with respect to the optical axis of the incident optical means 8. The polarizing plate is tilted with respect to the optical axis to reduce return light toward a light source means 1.

In this embodiment, even when two light beams emitted from first and second light emitting portions 1a and 1b do not have the same polarization direction, the light beams are transmitted through the polarizing plate 18, thereby obtaining a substantially same polarization direction P before the light beams become incident on first and second optical elements 6a and 6b molded using a resin material. With this arrangement, the interval error between scanning lines in the sub scanning direction is set to be ⅕ or less of the interval between original scanning lines.

In this embodiment, the polarized light limiting means can be adjustably rotated about the optical axis. If the means cannot be adjusted, or if possible, the adjustable angle is too small, the following problem may occur. In the above case, if the polarization angle difference between the light beams emitted from the first and second light emitting portions 1a and 1b is too large, the amounts of light beams emerging from the polarizing plate 18 may have a large difference. At this time, even though the interval error in the sub scanning direction can be reduced, the density undesirably changes for each scanning line, resulting in degradation in printing quality. Hence, the polarized light limiting means is preferably adjustably rotated about the optical axis. If such a structure is impossible, the polarization angle difference between the light beams emitted from the first and second light emitting portions 1a and 1b is preferably set to be 45° or less, as in the above-described first embodiment. Otherwise, the light amounts of the light emitting portions may be respectively adjusted.

In this embodiment, especially, to effectively reduce return light toward the light source means 1, the polarizing plate 18 is arranged immediately after the aperture stop 3. The position of the polarizing plate 18 is not limited to the above position, and the same effect as described above can be obtained when the polarizing plate 18 is set in the optical path between the light source means 1 and a scanning optical means 6.

<Third Embodiment>

Figure 4:
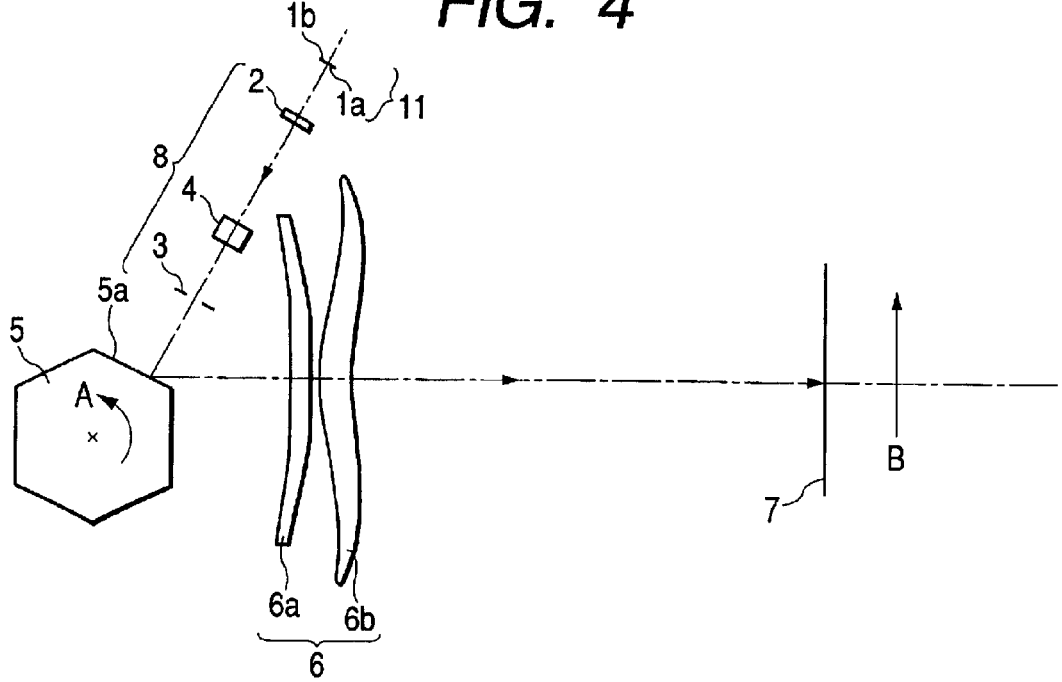
FIG. 4 is a sectional view showing the main part in the main scanning direction in the third embodiment of the present invention.
Figure 5:
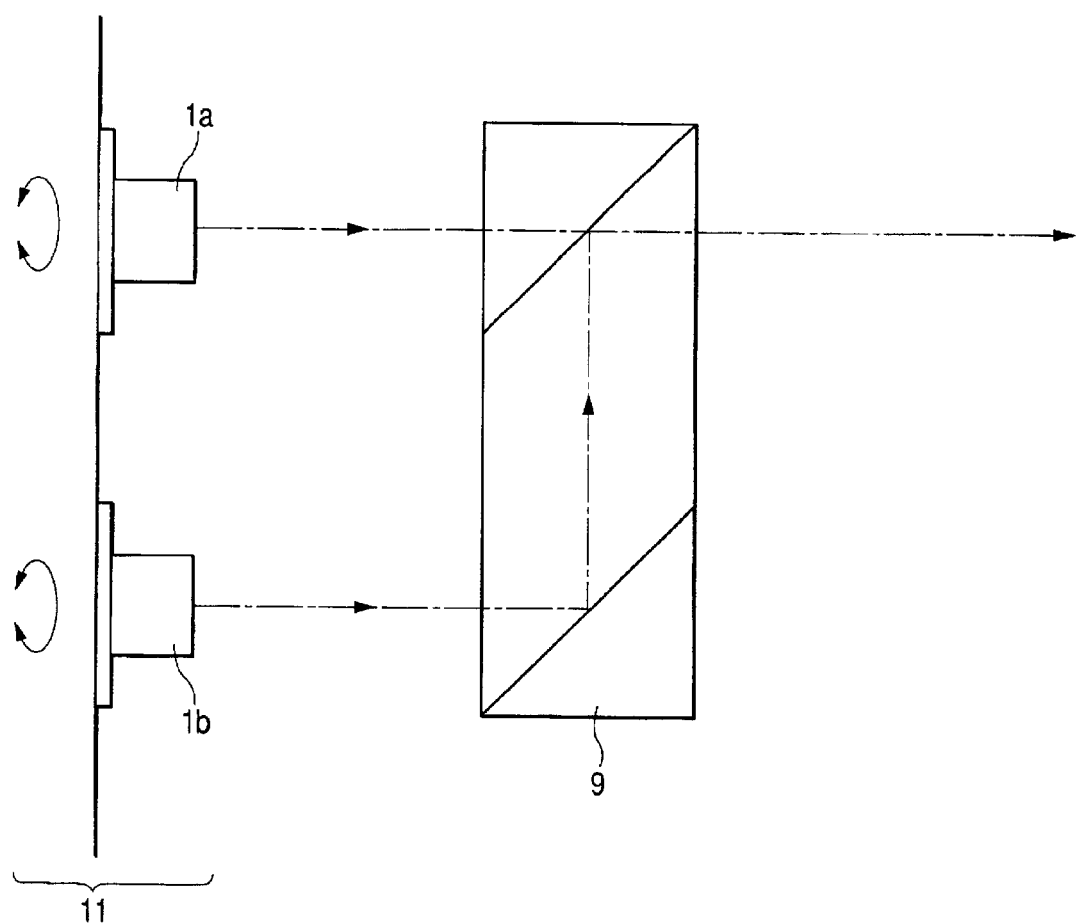
FIG. 5 is a view showing the arrangement of light source means according to the third embodiment of the present invention.

FIG. 4 is a sectional view (main-scanning sectional view) showing the main part in the main scanning direction in the third embodiment of the present invention. FIG. 5 is a schematic view showing the main part near a light source means shown in FIG. 4. The same reference numerals as in FIG. 1 denote the same elements in FIGS. 4 and 5.

The third embodiment is different from the above-described first embodiment in that first and second light emitting portions 1a and 1b are independently arranged, and the polarization angles of light beams emitted from the first and second light emitting portions 1a and 1b can be adjustably rotated about the principal axis of a scanning optical means 6. The remaining components and optical function are almost the same as in the first embodiment whereby the same effect as in the first embodiment is obtained.

Referring to FIG. 5, light source means 11 has the first and second light emitting portions 1a and 1b that are independently arranged. In this embodiment, the polarization angles of light beams emitted from the first and second light emitting portions 1a and 1b can be adjustably rotated about the principal axis of the scanning optical means 6, thereby reducing the interval error between scanning lines in the sub scanning direction. Optical path combining means 9 guides the optical paths of the light beams emitted from the first and second light emitting portions 1a and 1b with small angles in the sub scanning direction such that a desired interval can be finally obtained on the scanning surface.

In this embodiment, the optical paths of light beams emitted from the first and second light emitting portions 1a and 1b are guided in almost the same direction using the optical path combining means 9, as shown in FIG. 5. However, when the sub-scanning distance between the first and second light emitting portions 1a and 1b is sufficiently short, the optical path combining means 9 may be omitted.

In actual adjustment, for example, a polarizing plate which passes only a component having a polarization angle substantially perpendicular to a principal axis that should match a polarization direction P of an incident beam on the main-scanning section of first and second optical elements 6a and 6b is prepared. One of the first light emitting portion 1a and second light emitting portion 1b is caused to emit light, and then, the spot is observed through the polarizing plate. Since the light component observed at this time is a polarized light component in a direction different from the principal axis which should match the polarization direction, the polarization angle of light beam at the light emitting portion that is emitting light is adjusted such that the light amount is minimized. If such light amount that affects the scanning line interval remains, the polarization angle of the light beam from the light emitting portion that is emitting light is adjusted such that two spots formed have almost the same light amount in the sub scanning direction.

After that, the polarization angle of the light beam emitted from the other light emitting portion is adjusted in the same way as described above. Then, even when the light source means 11 is rotated about the optical axis to adjust the scanning line interval in the sub scanning direction, the scanning line interval does not increase or decrease in accordance with the scanning position because the differences between the principal axes of the first and second optical elements 6a and 6b of the scanning optical means 6 on the main-scanning section and the polarization angles of the first and second light emitting portions 1a and 1b are almost constant. The polarization angles of the light beams emitted from the first and second light emitting portions 1a and 1b may be shifted by the same angle with respect to the principal axes of the first and second optical elements 6a and 6b in consideration of adjustment or the like.

The polarization directions P of the light beams emitted from the light emitting portions may be adjusted by observing the peak light amounts of spots without using any polarizing plate. This is because extraordinary light is minimized when the peak light amount of a spot is maximized, and at this time, the extraordinary light distribution generally becomes almost symmetrical with respect to the main-scanning section. If the polarization direction P cannot be adjusted due to some reason, the polarization angle difference may be adjusted using a polarizing plate, as described in the second embodiment.

Figure 6:
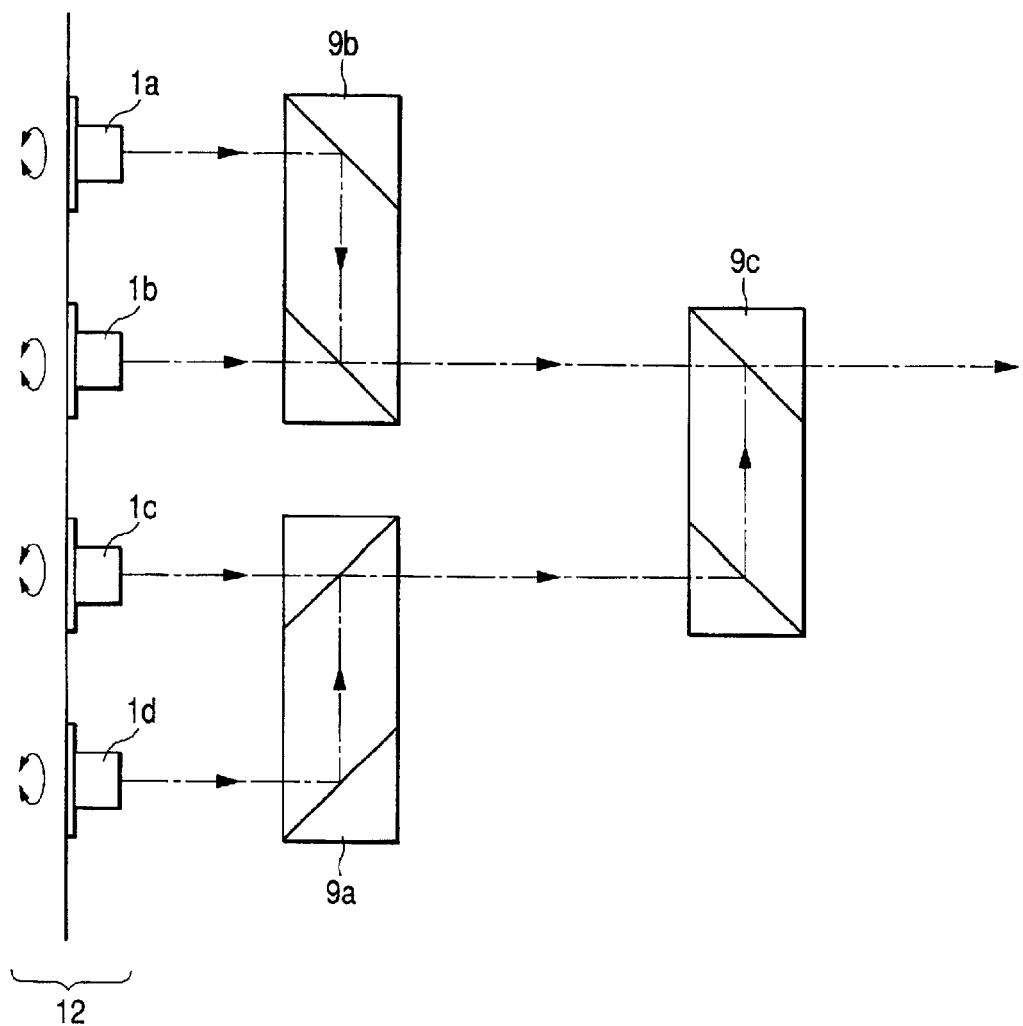
FIG. 6 is a view showing another arrangement of the light source means according to the third embodiment of the present invention.

In this embodiment, the number of light emitting portions is two. Even when the number of light emitting portions is increased to three or more, as shown in FIG. 6, the same effect as described above can be obtained using the above-described arrangement and adjustment. Referring to FIG. 6, light source means 12 has four light emitting portions 1a to 1d independently provided. Optical path combining means 9a to 9c are the same as in FIG. 5. In this embodiment, the optical path combining means 9 is inserted between the light source means 1 and a collimator lens 2. However, the order of the collimator lens 2 and optical path combining means 9 may be reversed. In this case, a collimator lens must be provided for each light emitting portion.

<Fourth Embodiment>

Figure 7:
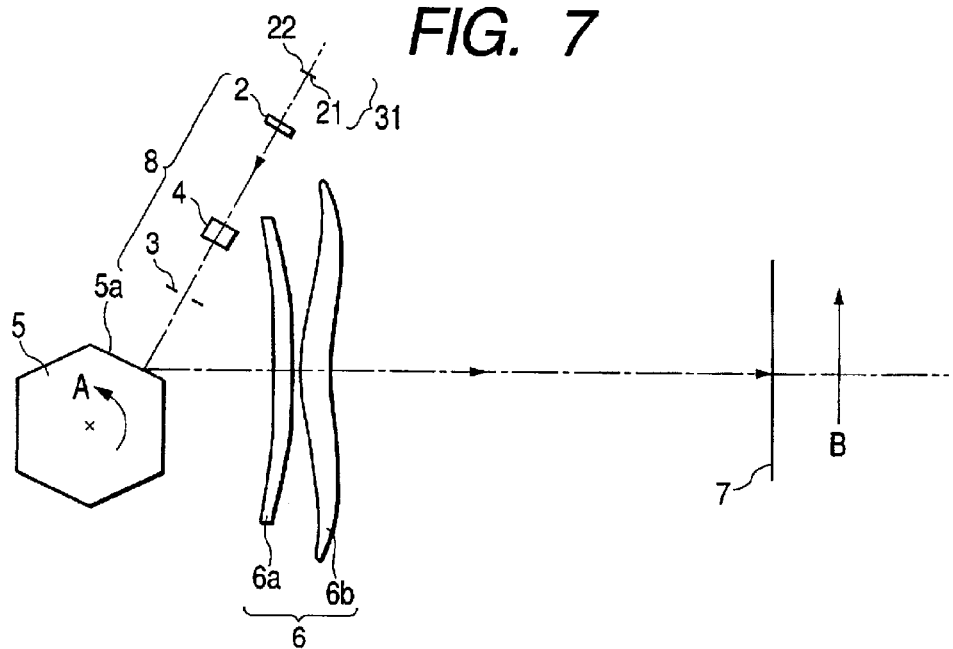
FIG. 7 is a sectional view showing the main part in the main scanning direction in the fourth embodiment of the present invention.
Figure 8:
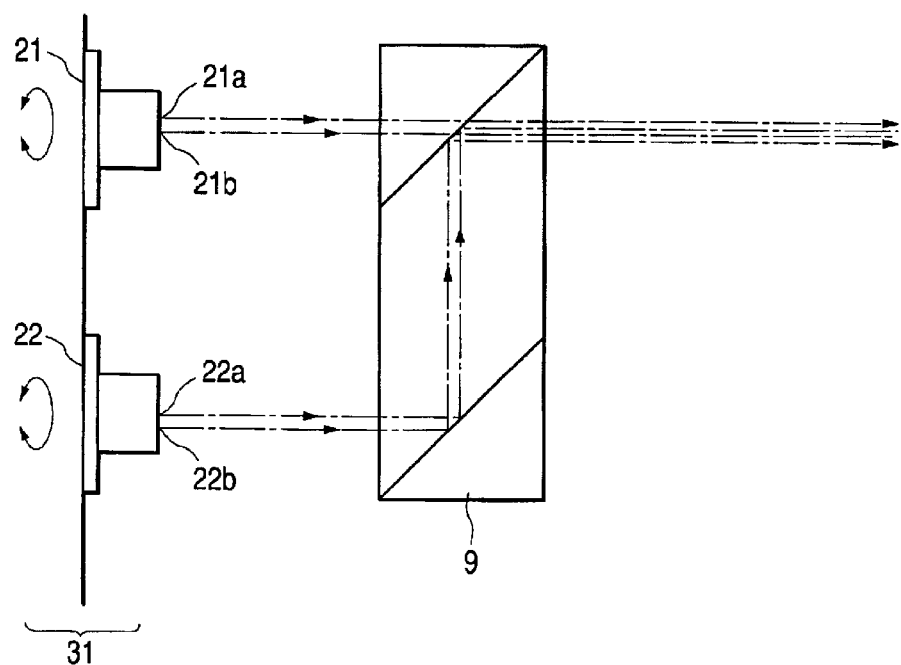
FIG. 8 is a view showing the arrangement of light source means according to the fourth embodiment of the present invention.

FIG. 7 is a sectional view (main-scanning sectional view) showing the main part in the main scanning direction in the fourth embodiment of the present invention. FIG. 8 is a schematic view showing the main part near light source means shown in FIG. 7. The same reference numerals as in FIGS. 4 and 5 denote the same elements in FIGS. 7 and 8.

The fourth embodiment is different from the above-described first embodiment in that light source means 31 consists of two, first and second monolithic multi-beam light sources (multi-beam array lasers) 21 and 22, and the polarization angles of light beams emitted from the first and second multi-beam light sources can be adjustably rotated about the principal axis of scanning optical means 6. The remaining components and optical function are almost the same as in the first embodiment whereby the same effect as in the first embodiment is obtained.

Referring to FIGS. 7 and 8, the light source means 31 has the two, first and second monolithic multi-beam light sources 21 and 22. The first multi-beam light source 21 has two, first and second light emitting portions 21a and 21b. The second multi-beam light source 22 has two, first and second light emitting portions 22a and 22b. An optical path combining means 9 has the same function as shown in FIG. 5, i.e., guides the optical paths of light beams emitted from the first and second multi-beam light sources 21 and 22 in substantially the same direction.

In this embodiment, the number of light emitting portions is increased as compared to the first embodiment, thereby enabling faster and more precise operation. In addition, the first and second multi-beam light sources 21 and 22 are independent and can be adjustably rotated about the principal axis of the scanning optical means 6. With this arrangement, the interval error between scanning lines in the sub scanning direction is reduced.

The adjustment method is the same as in the third embodiment. However, appropriate balancing is necessary because the polarization angle differences between the first and second light emitting portions 21a and 21b of the first multi-beam light source 21 and between the first and second light emitting portions 22a and 22b of the second multi-beam light source 22 cannot be changed. If the polarization angle difference is too large, the polarization angle difference may be decreased using polarized light limiting means (polarizing plate), as described in the second embodiment. These effects can be obtained independently of the number of light sources and the number of light emitting portions.

<Fifth Embodiment>

Figure 9:
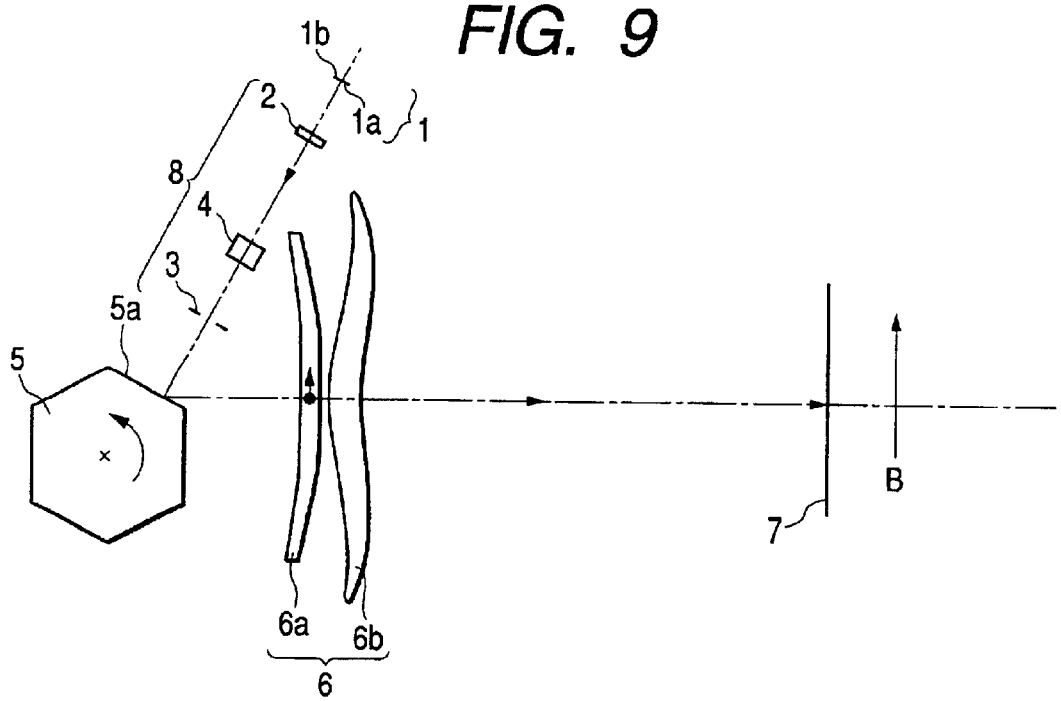
FIG. 9 is a sectional view showing the main part in the main scanning direction in the fifth embodiment of the present invention.

FIG. 9 is a sectional view (main-scanning sectional view) showing the main part in the main scanning direction in the fifth embodiment of the present invention. The same reference numerals as in FIG. 1 denote the same elements in FIG. 9.

The fifth embodiment is different from the above-described first embodiment in that a first optical element 6a of scanning optical means is decentered in the sub scanning direction. The remaining components and optical function are almost the same as in the first embodiment whereby the same effect as in the first embodiment is obtained.

That is, in this embodiment, the first optical element 6a of the scanning optical means 6 is decentered in the sub scanning direction, thereby reducing the interval error between scanning line in the sub scanning direction.

Figure 10:
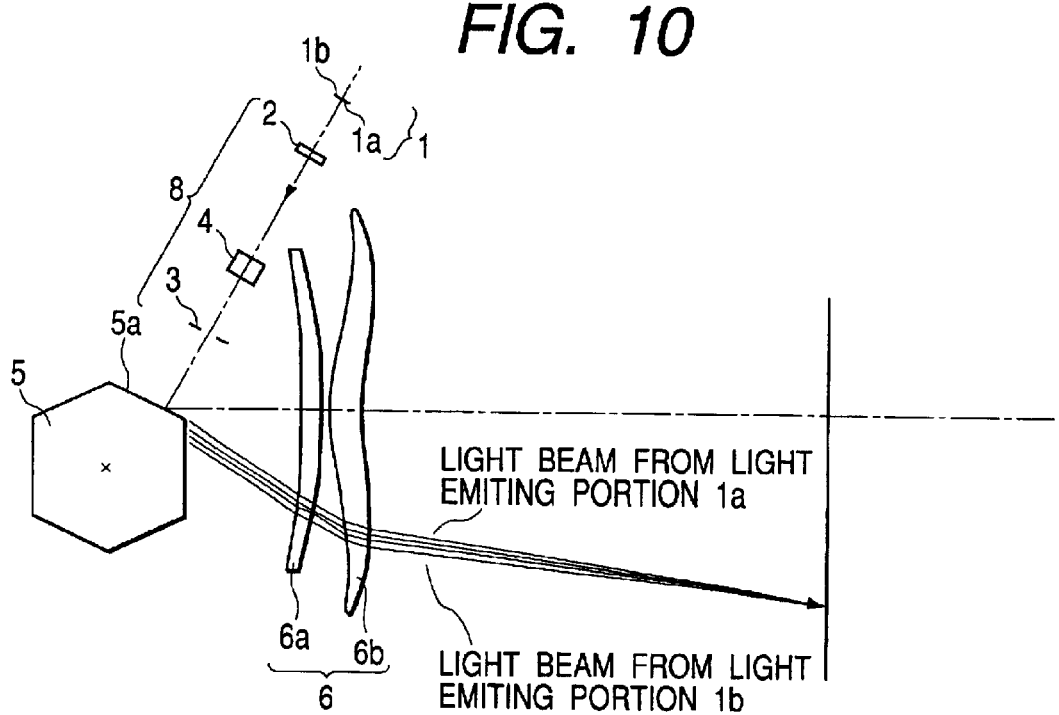
FIG. 10 is a view showing the positional relationship between light beams in the fifth embodiment of the present invention.

Generally, it is difficult to completely eliminate the interval difference (distance difference) between a plurality of light emitting portions in the main scanning direction without using a relay optical system or the like. A plurality of light emitting portions have an interval error to some degree in the main scanning direction. For this reason, even when the modulation timing for the plurality of light emitting portions is adjusted to print at the same position in the main scanning direction, the plurality of light beams from the plurality of light emitting portions pass through different positions on the first and second optical elements 6a and 6b of the scanning optical means 6, as shown in FIG. 10.

Figure 11:
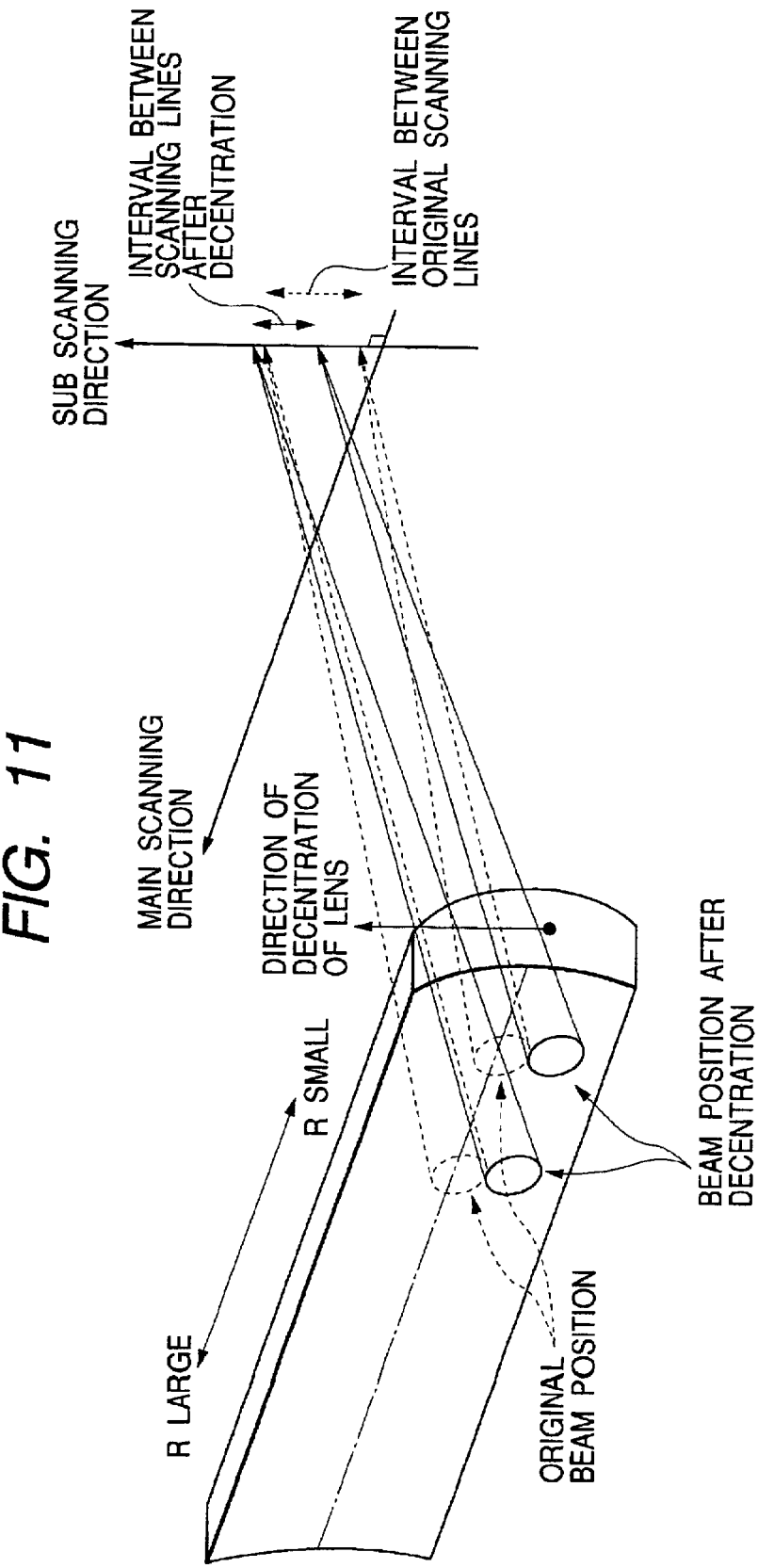
FIG. 11 is a view showing the positional relationship between light beams and their image forming positions in the fifth embodiment of the present invention.
Figure 12:
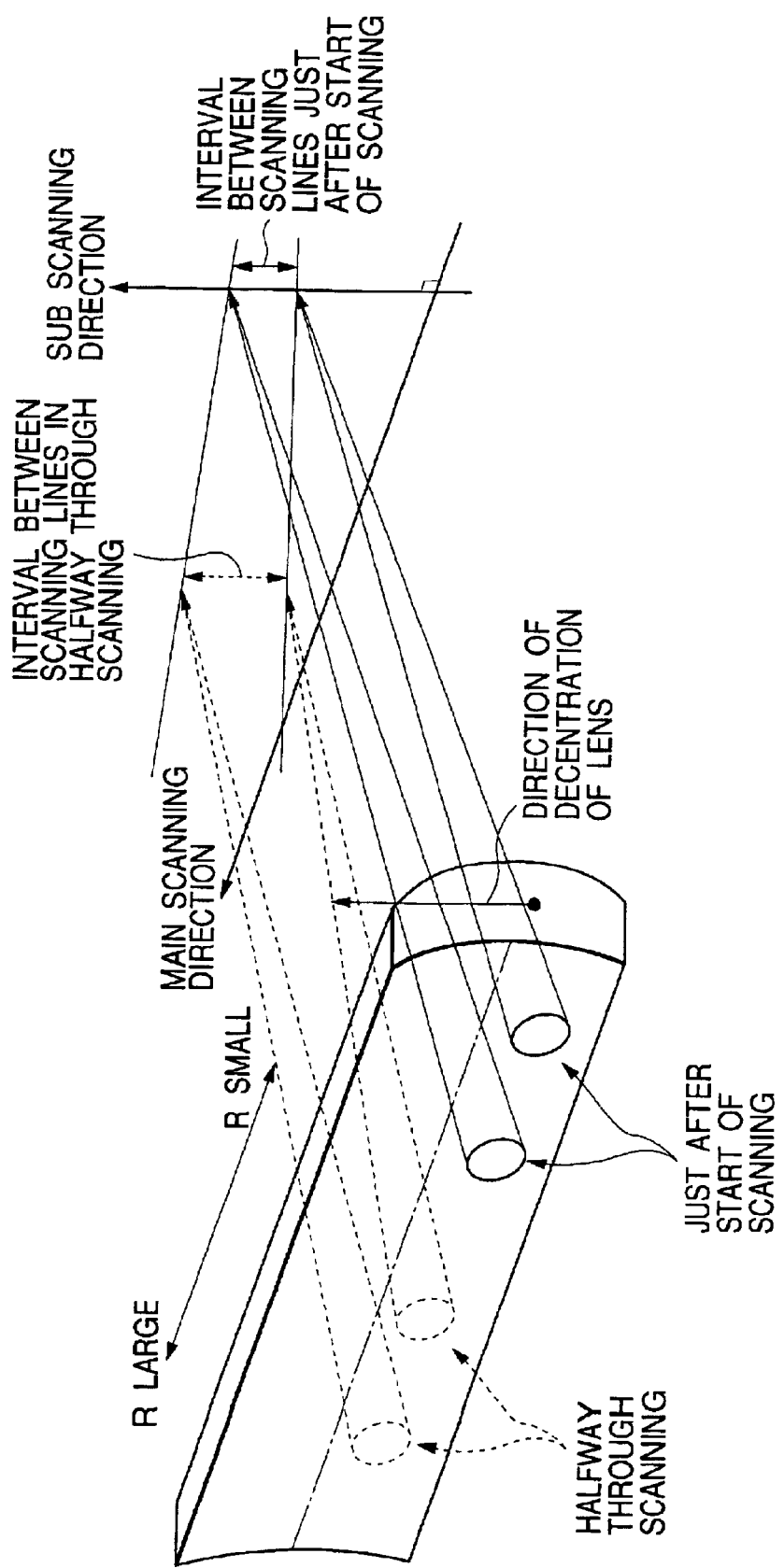
FIG. 12 is a view showing the positional relationship between scanning lines at the time of decentration in the fifth embodiment of the present invention.

For this reason, when a part or all of the optical elements of the scanning optical means 6 are decentered, the image positions of the light beams mainly shift in the sub scanning direction in accordance with the sub-scanning powers at the light beam passing positions and the optical path length from the refracting surface to the scanning surface. For example, assume that the decentered optical element has such optical power in the sub-scanning direction that becomes larger as being farther from the optical axis, and the element is decentered to the upper side in FIG. 11. In this case, when the preceding light beam forms a scanning line on the upper side as shown in FIG. 11, the light beam that starts scanning next is bent upward than the preceding light beam, so the scanning line interval decreases at the scanning start position, as shown in FIG. 12. Conversely, at the scanning end position, since the preceding light beam is bent upward than the succeeding light beam, the scanning line interval increases.

When the power in the sub scanning direction becomes smaller as being farther from the optical axis, the above relationship is reversed. The relationship is also reversed when the light beam that scans on the upper side is not the preceding light beam but the succeeding light beam.

Even when the power in the sub scanning direction does not change, the optical path length changes. Hence, the interval between scanning lines is changed by decentering the optical element in the sub scanning direction. In this embodiment, the interval error between scanning lines in the presence of a polarization angle difference is canceled by positively using the above phenomenon.

Figure 13:
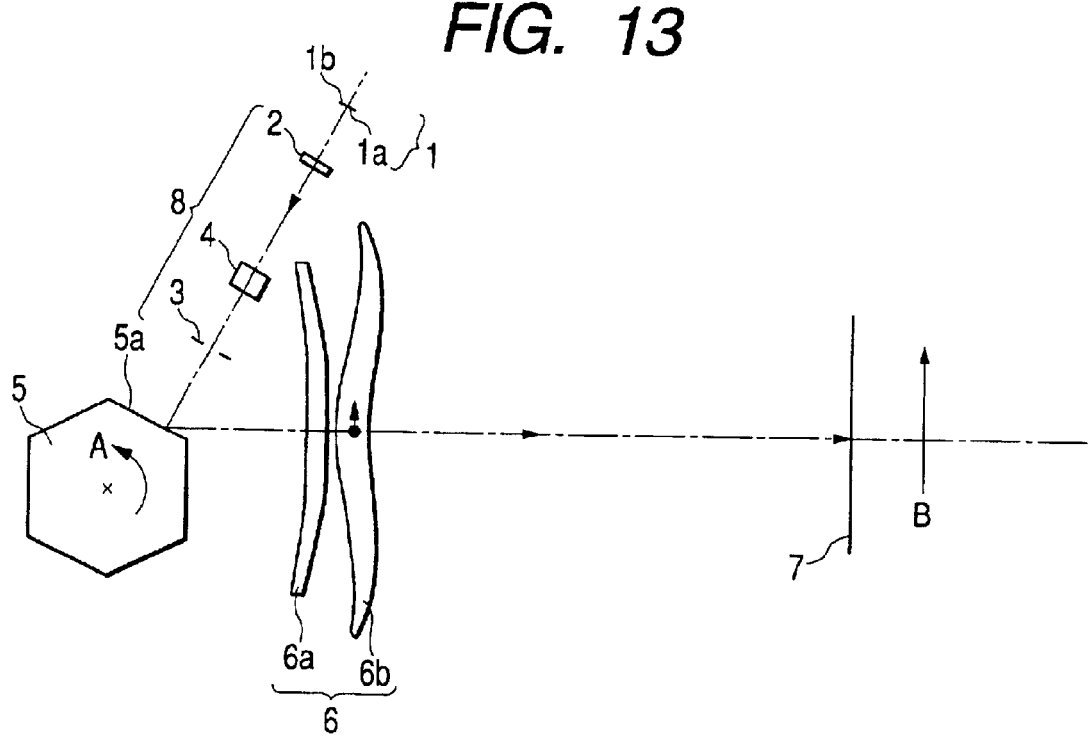
FIG. 13 is a sectional view showing the main part in the main scanning direction in the fifth embodiment of the present invention.
Figure 14:
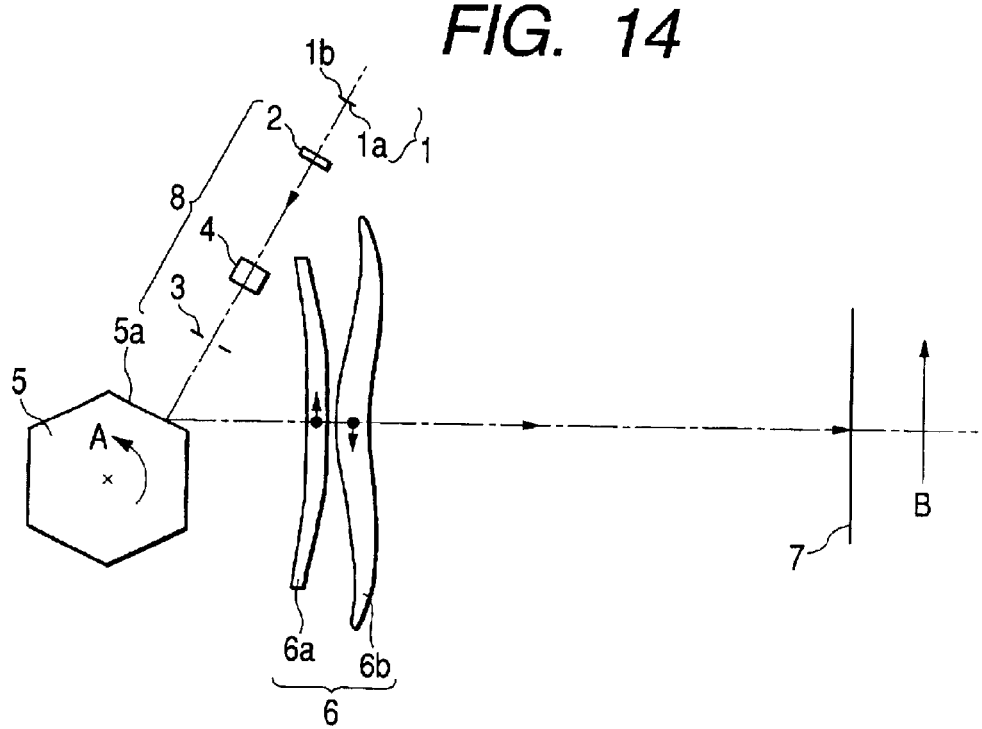
FIG. 14 is a sectional view showing the main part in the main scanning direction in the fifth embodiment of the present invention.

In this embodiment, the first optical element 6a is decentered. However, even when the second optical element 6b is decentered, as shown in FIG. 13, the same effect as described above can be obtained. Even when both the first and second optical elements 6a and 6b are decentered in balance, as shown in FIG. 14, the same effect as described above can be obtained. In this embodiment, shift decentration perpendicular to the sub scanning direction is employed. However, the same effect as described above can be obtained even when the optical element is tilted in the vertical direction (rotary decentration) about the main scanning axis.

In the present invention, the same effect as described above can be obtained even when both shift decentration and rotary decentration are done.

This embodiment may be combined with any one of the above-described first to fourth embodiments.

Figure 35:
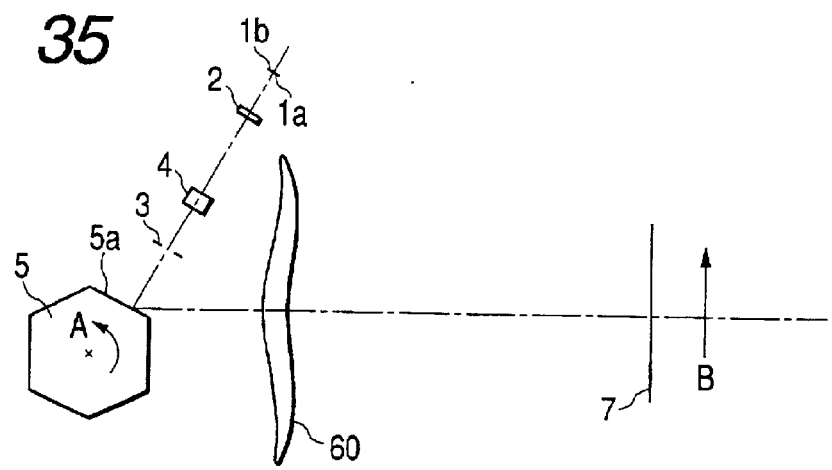
FIG. 35 is an explanatory view showing an example using a single resin scanning lens of the present invention.

In the first to fifth embodiments, the number of resin lenses of the present invention in each of which the directions of the principal axes of birefringence change between the lens left end (off-axis) and the lens right end (off-axis) in the main scanning direction (FIGS. 17, 18, 19A and 19B), and in each of which the directions of the principal axes of birefringence at each lens end form an asymmetrical distribution in the sub scanning direction (FIGS. 19A and 19B) is two. However, the number of lenses may be one or three or more. FIG. 35 shows an example using a single resin lens. A refractive optical element (lens) 60 has birefringence and is formed by molding using a resin.

Further, the scanning optical means 6 may include a reflecting optical element made of glass and having a power in addition to the refractive optical element (lens) of the present invention, which has birefringence and is formed by molding using a resin.

The scanning optical element may include a diffraction surface. The scanning optical element of the present invention may be either an element having a diffraction surface formed on a surface of a refractive optical element (lens) having a power or an element having a diffraction surface formed on a flat glass surface.

The resin scanning optical element (lens) of the present invention, which exhibits index anisotropy, may be either an element having a positive power or an element having a negative power. In the present invention, the light beam from the light source means 1 may be directly guided to the optical deflector 5 through the aperture stop 3 without using the collimator lens 2 and the cylindrical lens 4.

As described above, in the first to fifth embodiments, all lenses of the scanning optical means 6 are scanning lenses made of a resin. However, the present invention is not limited to this structure. The scanning optical means 6 may include one or a plurality of scanning lenses made of glass.

<Sixth Embodiment>

Figure 36:
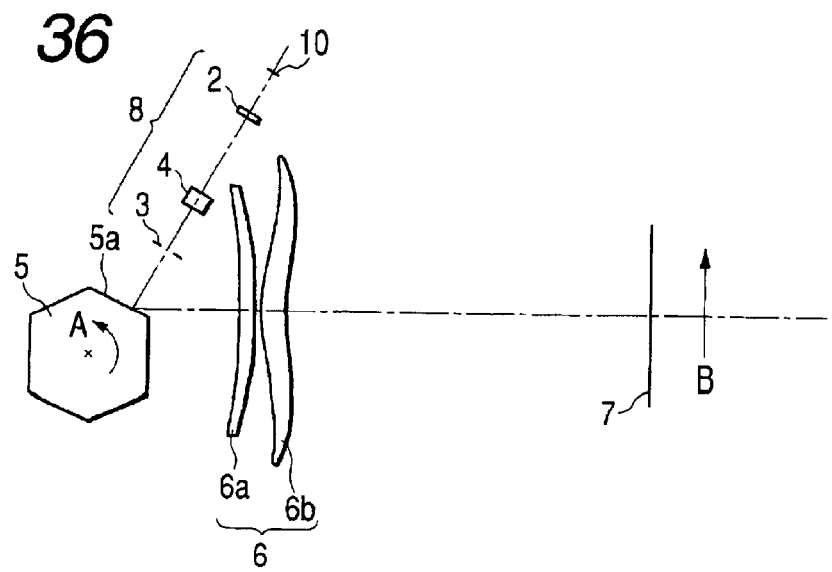
FIG. 36 is an explanatory view used for the sixth embodiment in which a single light emitting portion is present.

FIG. 36 is a sectional view (main-scanning sectional view) showing the main part in the main scanning direction of an optical scanning apparatus according to the sixth embodiment of the present invention.

In this specification, a direction in which a light beam is reflected and deflected (deflected and scanned) by the deflection means is defined as the main scanning direction, and a direction perpendicular to the optical axis of the scanning optical means and the main scanning direction is defined as the sub scanning direction.

Referring to FIG. 36, light source means 10 consists of, e.g., a single-beam semiconductor laser and has one light emitting portion. A collimator lens 2 converts a divergent light beam emitted from the light source means 10 into a substantially parallel light beam. A cylindrical lens (cylinder lens) 4 has a predetermined refracting power only in the sub scanning direction to focus the substantially parallel light beam transmitted through the collimator lens 2 as an almost linear image on a deflecting surface 5a of an optical deflector 5 (to be described later) in the sub-scanning section. An aperture stop 3 shapes the light beam emerging from the cylindrical lens 4 into a desired optimum beam shape. In this embodiment, the aperture stop 3 is arranged near the deflecting surface 5a of the optical deflector 5 (to be described later) to reduce the shift in printing position of the light beam in the main scanning direction.

Each of the collimator lens 2, cylindrical lens 4, and aperture stop 3 constitutes an element of incident optical means 8.

The optical deflector 5 serving as the deflection means comprises, e.g., a polygon mirror (rotary polyhedral mirror). The optical deflector 5 is rotated in a direction indicated by an arrow A in FIG. 36 at a predetermined speed by drive means (not shown) such as a motor.

A scanning optical means (f-θ lens system) 6 having an f-θ characteristic has two, first and second optical elements (toric lenses) 6a and 6b made of a resin (plastic) and forms images of two light beams based on image information deflected by the optical deflector 5 on a photosensitive drum surface 7. The scanning optical means has a correction function for correcting a surface inclination of the optical deflector 5 by making the deflecting surface 5a of the optical deflector 5 and the photosensitive drum surface 7 optically conjugate each other in the sub-scanning section.

The photosensitive drum surface 7 serves as a surface to be scanned (scanning surface).

In this embodiment, a divergent light beam emitted from the single-beam semiconductor laser 10 is converted into a substantially parallel light beam by the collimator lens 2 and becomes incident on the cylindrical lens 4. In the main-scanning section, the single substantially parallel light beam incident on the cylindrical lens 4 emerges while being kept unchanged and passes through the aperture stop 3 (the light beam is partially shielded). In the sub-scanning section, the light beam converges and passes through the aperture stop 3 (the light beam is partially shielded) and form a substantially linear image (linear image long in the main scanning direction) on the deflecting surface 5a of the optical deflector 5. The single light beam deflected by the deflecting surface 5a of the optical deflector 5 is guided onto the photosensitive drum surface 7 through the first and second optical elements 6a and 6b to optically scan the photosensitive drum surface 7 in a direction indicated by an arrow B as the optical deflector 5 is rotated in the direction of an arrow A. With this operation, an image is recorded on the photosensitive drum surface 7 serving as a recording medium.

In this embodiment, the sub-scanning magnification of the scanning optical means 6 is set to be almost uniform for the entire scanning range such that the sub-scanning interval between scanning lines becomes almost constant in an ideal situation.

In this embodiment, the single divergent light beam emitted from the single-beam semiconductor laser 10 is converted into a substantially parallel light beam by the collimator lens 2. The effect of the present invention to be described below can also be obtained even when the light beam is converted into a convergent light beam or a divergent light beam.

In this embodiment, to facilitate manufacturing and reduce cost, the first and second optical elements 6a and 6b of the scanning optical means 6 are molded using a resin material "ZEONEX". For this reason, a principal axis distribution as shown in FIGS. 18, 19A, and 19B is present in each of the first and second optical elements 6a and 6b. Hence, as described in the foregoing, if light beams emerging from the first and second light emitting portions 1a and 1b have different polarization angles, the interval between scanning lines in the sub scanning direction is not constant, resulting in degradation in printing quality.

According to an experiment by the present inventor, as shown in FIG. 26A when a sub-scanning interval error of 1 mm or more was generated between the left end and the right end of the effective scanning region of scanning lines that run in the main scanning direction, the printing quality considerably degraded.

In this embodiment, the polarization angle of the light beam emitted from the light emitting portion of the light source means 10 is adjusted by rotation about the optical axis such that the sub-scanning interval error between the left end and the right end of the effective scanning region of scanning lines that run in the main scanning direction becomes less than 1 mm. With this arrangement, a single-beam scanning optical apparatus which reduces the sub-scanning interval error between the left end and the right end of the effective scanning region of scanning lines and can perform high-quality high-speed printing at a relatively low cost is obtained.

The same effect as described above can also be obtained by decentering the first optical element 6a of the scanning optical means in the sub scanning direction, as in the above-described fifth embodiment.

The first optical element 6a is decentered. However, even when the second optical element 6b is decentered, as shown in FIG. 13, the same effect as described above can be obtained. Even when both the first and second optical elements 6a and 6b are decentered in balance, as shown in FIG. 14, the same effect as described above can be obtained. In this embodiment, shift decentration perpendicular to the sub scanning direction is employed. However, the same effect as described above can be obtained even when the optical element is tilted in the vertical direction (rotary decentration) about the main scanning axis.

In the present invention, the same effect as described above can be obtained even when both shift decentration and rotary decentration are done.

A lens molded using a resin material has birefringence, and the directions of principal axes of birefringence change depending on position. Especially, an asymmetrical principal axis distribution is formed in the sub scanning direction, as shown in FIGS. 19A and 19B.

However, when a height (sub-scanning width) h of the resin lens is as large as 15 times or more of a sub-scanning width t of a light beam passing through the lens, the asymmetrical distribution of the principal axes of birefringence in the light beam becomes relatively small. To reduce the influence of birefringence, a lens having the above structure is preferably used. In fact, it is difficult for a lens used for a scanning optical means to satisfy h/t>15 because the cost may increase due to the material cost and longer molding time.

However, even when use of a lens that satisfies h/t≦15 makes the problem pointed out in this specification conspicuous, that problem can be solved by using the means described in this specification.

In this embodiment, for the deflection-means-side lens 6a used in the scanning optical means, h/t=22.3, i.e., the lens shape is preferable to reduce the influence of birefringence. However, for the lens 6b on the photosensitive drum surface 7 side, h/t=11.7. That is, the lens is readily affected by birefringence. However, the influence is reduced using the measures described above.

When the height (sub-scanning width) h of the scanning lens made of a resin is 1.8 times or more of a thickness (optical-axis-direction width) d of the optical element, heat dissipation occurs from the direction of thickness more than from direction of height in cooling of the molding process, and consequently, the lens is rapidly cooled and hardened. For this reason, the directions of principal axes of birefringence are fixed before the principal axes start largely tilting. Hence, the asymmetrical distribution of the principal axes in the sub scanning direction becomes small.

To reduce the influence of birefringence, a lens having the above structure is preferably used. In fact, if the thickness is too small, the resin cannot be smoothly supplied into the mold, resulting in birefringence. In addition, if the height (sub-scanning width) h of the lens is too large, the cost undesirably increases.

However, even when use of a lens that satisfies h/d≦1.8 makes the problem pointed out in this specification conspicuous, that problem can be solved by using the means described in this specification. In this embodiment, h/d=1.53 for the deflection-means-side lens 6a used in the scanning optical means, and h/d=1.63 for the lens 6b on the photosensitive drum surface 7 side, i.e., the lens shapes are readily affected by birefringence. However, the influence is reduced using the measures described above.

If there are a plurality of scanning lenses made of a resin, the interval error between scanning lines due to birefringence appears as an accumulation of influence of birefringence of each lens.

However, to make the cost consistent with the optical performance, a plurality of (two or more) scanning lenses made of a resin need often be used. The influence of birefringence also depends on the direction of incidence of a light beam or the shape of a lens. For this reason, the interval error between scanning lines in the sub scanning direction does not linearly change with respect to the main scanning direction. When a plurality of lenses are present, the error may be canceled at a certain portion and amplified at another portion. If such a portion is locally formed, that portion becomes very noticeable, resulting in degradation in printing quality. In this embodiment, two lenses having birefringence are used As for the scanning optical means. However, the influence is reduced using the measures described above.

The reason why the influence of birefringence becomes serious when all lenses used for the scanning optical means are resin lenses having birefringence will be described below.

When the scanning optical means consists of a plurality of resin lenses having birefringence, the interval error due to the birefringence almost appears as an accumulation of influence of birefringence of each lens. This is due to the following reason. Since the distribution of tilts of principal axes of birefringence easily depends on the outer shape of a lens, and each lens used in the scanning optical means often has a rectangular shape because of the space, the directions of the tilts of the principal axes of birefringence at a position in the lens are the same for any lens more or less.

The influence of birefringence also depends on the direction of incidence of a light beam or the shape of a lens. For this reason, the interval error between scanning lines in the sub scanning direction does not strictly linearly change with respect to the main scanning direction. Hence, when a plurality of lenses having birefringence are used, influences from portions contributing to occurrence of large interval error are accumulated to thereby cause a portion at which the interval error between scanning lines is locally increased. If such a portion is locally formed, that portion becomes very noticeable on a printed image, resulting in degradation in printing quality.

The influence of birefringence also depends on the thickness of a lens. Generally, as the thickness increases, the influence of birefringence more readily appears. Hence, even a single but thick resin lens having birefringence readily generates a sub-scanning interval error between the left end and the right end of the effective scanning region of scanning lines. Furthermore, when only a single lens is used for the scanning optical means, the lens tends to be thick to obtain an f-θ characteristic and the like. For this reason, if the single lens used for the scanning optical means is a resin lens having birefringence, the interval error between scanning lines is readily generated.

As described above, when all lenses used for the scanning optical means are resin lenses having birefringence, the influence of birefringence is large, and therefore, the sub-scanning interval error between the left end and the right end of the effective scanning region of scanning lines readily occurs. However, such a structure is often positively employed to make the cost consistent with the optical performance, though it would be proper to avoid such a structure. The effect of the present invention can be obtained especially in this case, and the degradation in printed image quality due to the interval error between scanning lines can be reduced by using the measured proposed in the present invention.

In this embodiment, both the two lenses of the scanning optical means are made of resin lenses having birefringence. However, the influence is reduced by using the measures described above.

In the sixth embodiment, the number of resin lenses of the present invention in each of which the directions of the principal axes of birefringence change between the lens left end (off-axis) and the lens right end (off-axis) in the main scanning direction (FIGS. 17, 18, 19A and 19B), and each of which the directions of the principal axes of birefringence at each lens end form an asymmetrical distribution in the sub scanning direction (FIGS. 19A and 19B) is two. However, the number of lenses may be one or three or more.

Further, the scanning optical means 6 may include a reflecting optical element made of glass and having a power in addition to the refractive optical element (lens) of the present invention, which has birefringence and is formed by molding using a resin.

The scanning optical element may include a diffraction surface. The scanning optical element of the present invention may be either an element having a diffraction surface formed on a surface of a refractive optical element (lens) having a power or an element having a diffraction surface formed on a flat glass surface.

The resin scanning optical element (lens) of the present invention, which exhibits index anisotropy, may be either an element having a positive power or an element having a negative power.

As described above, in the sixth embodiment, all lenses of the scanning optical means 6 are scanning lenses made of a resin. However, the present invention is not limited to this structure. The scanning optical means 6 may include one or a plurality of scanning lenses made of glass.

<Image Forming Apparatus>

Figure 15:
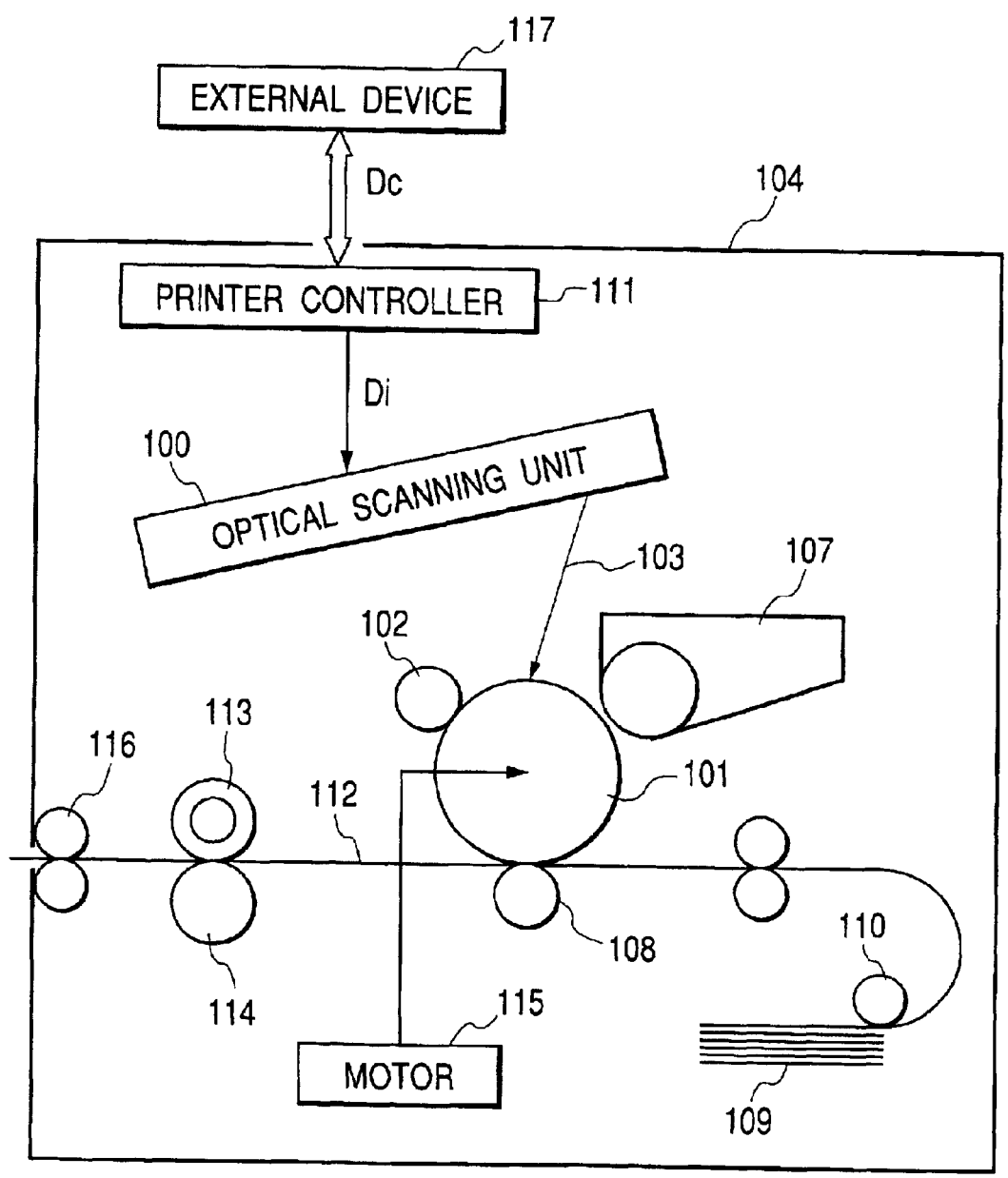
FIG. 15 is a sectional view showing the main part in the sub scanning direction of an image forming apparatus (electrophotographic printer) using a scanning optical apparatus of the present invention.

FIG. 15 is a sectional view showing the main part in the sub scanning direction of an image forming apparatus (electrophotographic printer) according to an embodiment using the scanning optical apparatus according to any one of the first to fifth embodiments of the present invention. Referring to FIG. 15, an image forming apparatus 104 receives code data Dc from an external device 117 such as a personal computer. The code data Dc is converted into image data (dot data) Di by a printer controller 111 in the apparatus. The image data Di is input to an optical scanning unit (optical scanning apparatus) 100 according to any one of the first to fifth embodiments of the present invention. A light beam 103 modulated in accordance with the image data Di is emitted from the optical scanning unit 100. The photosensitive surface of a photosensitive drum 101 is scanned in the main scanning direction by the light beam 103.

The photosensitive drum 101 serving as a static latent image carrier (photosensitive body) is rotated clockwise by a motor 115. In accordance with this rotation, the photosensitive surface of the photosensitive drum 101 moves relative to the light beam 103 in the sub scanning direction perpendicular to the main scanning direction. A charging roller 102 for uniformly charging the surface of the photosensitive drum 101 is arranged on the upper side of the photosensitive drum 101 and abuts against its surface. The surface of the photosensitive drum 101, which is charged by the charging roller 102, is irradiated with the light beam 103 scanned by the optical scanning unit 100.

As described above, the light beam 103 is modulated on the basis of the image data Di. When the photosensitive drum surface is irradiated with the light beam 103, an electrostatic latent image is formed on the surface of the photosensitive drum 101. This electrostatic latent image is developed as a toner image by a developer 107 which abuts against the photosensitive drum 101 on the downstream side of the irradiation position of the light beam 103 along the rotation direction of the photosensitive drum 101. Toner particles used here have, e.g., charges opposite to those applied by the charging roller 102. A portion (image portion) to which the toner sticks is an unexposed portion of the photosensitive drum. That is, in this embodiment, so-called normal development is performed. In this embodiment, inverted development may be done to make the toner stick to an exposed portion of the photosensitive drum.

The toner image developed by the developer 107 is transferred onto a paper sheet 112 as a transfer member by a transfer roller 108 arranged on the lower side of the photosensitive drum 101 to oppose the photosensitive drum 101. The paper sheet 112 is stored in a paper cassette 109 in front (right side in FIG. 15) of the photosensitive drum 101. Manual feed is also possible. A feed roller 110 is arranged at an end portion of the paper cassette 109 to feed the paper sheet 112 in the paper cassette 109 to a convey path.

The paper sheet 112 having an unfixed toner image transferred thereon in the above way is conveyed to a fixing device on the rear side (left side in FIG. 15) of the photosensitive drum 101. The fixing device comprises a fixing roller 113 having a fixing heater (not shown) inside and a press roller 114 pressed against the fixing roller 113. The unfixed toner image on the paper sheet 112 is fixed by pressing the paper sheet 112 conveyed from the transfer section by the press portion between the fixing roller 113 and the press roller 114 and heating the paper sheet 112. Discharge rollers 116 are arranged on the rear side of the fixing roller 113 to discharge the fixed paper sheet 112 from the image forming apparatus.

Although not illustrated in FIG. 15, the printer controller 111 executes not only data conversion described above but also control for the sections in the image forming apparatus 104, including the motor 115, and a polygon motor and the like in the optical scanning unit 100.

According to the present invention, there is provided a multi-beam scanning optical apparatus in which the scanning optical means has at least one scanning optical element made of a resin, in the scanning optical element made of the resin, with respect to an optical axis in a main scanning direction, birefringence at one end of the scanning optical element made of the resin has principal axes in directions different from those of the principal axes of birefringence at the other end of the scanning optical element made of the resin due to a stress distribution formed upon cooling in a molding process, an interval between adjacent scanning lines of scanning lines formed on the scanning surface by the plurality of light beams whose images are formed on the scanning surface through the scanning optical element made of the resin changes in the main scanning direction in an effective scanning region, and the apparatus comprises at least one setting means for setting a sub-scanning interval error between the scanning lines due to a polarization angle difference between the light beams emitted from the plurality of light emitting portions to be not more than $\frac{1}{5}$ of a desired scanning line interval, whereby high-quality high-speed printing can be performed with a relatively simple arrangement, and an image forming apparatus using the multi-beam scanning optical apparatus is provided.

What is claimed is:

1. A multi-beam scanning optical apparatus comprising:
   incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of a resin, and said scanning optical element made of the resin has birefringence due to a stress distribution generated upon cooling in a molding process thereof such that the directions of principal axes of birefringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanned surface by the plurality of light beams whose images are formed on the scanned surface through said scanning optical element made of the resin changes in the main scanning direction in an effective scanning region, and wherein said apparatus comprises at least one setting means for setting an interval error between scanning lines in a sub-scanning line direction, the interval error being caused by a relation in which polarization directions of the light beams emitted from the plurality of light emitting portions are not parallel or orthogonal with each other, to be not more than $\frac{1}{5}$ of a desired scanning line interval.

2. A multi-beam scanning optical apparatus comprising:

incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of resin, and said scanning optical element made of the resin has birefringence due to a stress distribution generated upon cooling in a molding process thereof such that the directions of principal axes of bifringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanned surface by the plurality of light beams whose images are formed on the scanned surface through said scanning optical element made of the resin changes in the main scanning direction in an effective scanning region, and said apparatus comprises at least one setting means for setting a sub-scanning interval error between the scanning lines due to a polarization angle difference between the light beams emitted from the plurality of light emitting portions to be not more than $\frac{1}{5}$ of a desired scanning line interval, said setting means comprising correction means for correcting the polarization angle difference between the plurality of light beams incident on said scanning optical element made of the resin, and wherein said setting means comprises adjustment means capable of independently adjusting polarization angles of light beams emitted from the plurality of light emitting portions.

3. A multi-beam scanning optical apparatus comprising:

incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of a resin, and said scanning optical element made of the resin has birefringence due to a stress distribution generated upon cooling in a molding process thereof such that the directions of principal axes of birefringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanned by the plurality of light beams whose images are formed on the scanned surface through said scanning optical element made of the resin changes in the main scanning direction in an effective scanning region, and said apparatus comprises at least one setting means for setting an actual sub-scanning interval error between the scanning lines on the scanning surface to be smaller than the sub-scanning interval error between the scanning lines on the scanned surface, caused by a relative displacement in polarization angle between the light beams emitted from the plurality of light emitting portions, said setting means comprising a scanning optical element made of a resin, which is shift-decentered perpendicularly to a sub scanning direction.

4. A multi-beam scanning optical apparatus comprising:

incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of a resin, and said scanning optical element made of the resin has birefringence due to a stress distribution generated upon cooling in a molding process thereof such that the directions of the principal axes of birefringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanned surface by the plurality of light beam whose images are formed on the scanned surface through said scanning optical element made of the resin changes in the main scanning direction in an effective scanning region, and said apparatus comprises at least one setting means for setting an actual sub-scanning interval error between the scanning lines on the scanned surface to be smaller than the sub-scanning interval error between the scanning lines on the scanned surface, caused by a relative displacement in polarization angle between the light beams emitted from the plurality of light emitting portions, said setting means comprising polarized light limiting means inserted into an optical path between the light source means and said scanning optical element made of the resin.

5. A multi-beam scanning optical apparatus comprising:

an incident optical system for making a plurality of light beams emitted from a light source having a purality of light emitting portions incident on a deflector, a scanning optical system for forming images with the plurality of light beams deflected by the deflector on a surface to be scanned, said scanning optical system having a plurality of scanning optical elements each made of a resin; and at least one setting means for setting an interval error between scanning lines in a sub-scanning line direction, the interval error being caused by a relation in which polarization directions of the light beams emitted from the plurality of light emitting portions are not parallel or orthogonal with each other, to be not more than ⅕ of a desired scanning line interval.

6. A multi-beam scanning optical apparatus comprising:

an incident optical system for making a plurality of light beams emitted from a light source having a plurality of light emitting portions incident on a deflector;

a scanning optical system for forming images of the plurality of light beams deflected by the deflector on a surface to be scanned, said scanning optical system having refractive optical elements all of which are scanning optical elements each made of a resin; and at least one setting means for setting an interval error between scanning lines in a sub-scanning line direction, the interval error being caused by a relation in which polarization directions of light beams emitted from the plurality of light emitting portions are not parallel or orthogonal with each other, to be not more than ⅕ of a desired scanning line interval.

7. A multi-beam scanning optical apparatus comprising:

incident optical means for making a plurality of light beams emitted from light source means having a plurality of light emitting portions incident on deflection means; and scanning optical means for forming images of the plurality of light beams deflected by said deflection means on a surface to be scanned;

wherein said scanning optical means has at least one scanning optical element made of a resin, and said scanning optical element made of the resin has birefringence due to a stress distribution generated upon cooling in a molding process thereof such that the directions of principal axes of birefringence at one end portion of said scanning optical element made of the resin are different from those at the other end portion, opposite to said one end portion with respect to an optical axis thereof in a main scanning direction, of said scanning optical element of the resin, and wherein an interval between adjusting scanning lines of scanning lines formed on the scanned surface by the plurality of light beams whose images are formed on the scanned surface through said scanning optical element made of the resin changes in the main scanning direction in an effective scanning region, and said apparatus comprises at least one setting means for setting an actual sub-scanning interval error between the scanning lines on the scanning surface to be smaller than the sub-scanning interval error between the scanning lines on the scanned surface, caused by a relative displacement in polarization angle between the light beams emitted from the plurality of light emitting portions, said setting means comprising a scannning optical element made of a resin, which is rotary-decentered about the main scanning direction.

8. A multi-beam scanning optical apparatus comprising:

incident optical means for making a plurality of light beams emitted from light source means having a plurality of light emitting portions incident on deflection means; and scanning optical means for forming images of the plurality of light beams deflected by said deflection means on a surface to be scanned, wherein said scanning optical means has at least one scanning optical element made of a resin, and said scanning optical element made of the resin has birefringence due to a stress distribution generated upon cooling in a molding process thereof such that the directions of principal axes of birefringence at one end portion of said scanning optical element made of the resin are different from those at the other end portion, opposite to said one end portion with respect to an optical axis thereof in a main scanning direction, of said scanning optical element made of the resin, and wherein an interval between adjacent scanning lines of scanning lines formed on the scanned surface by the plurality of light beams whose images are formed on the scanned surface through said scanning optical element made of the resin changes in the main scanning direction in an effective scanning region, and said apparatus comprises at least one setting means for setting an actual sub-scanning interval error between the scanning lines on the scanning surface to be smaller than the sub-scanning interval error between the scanning lines on the scanned surface, caused by a relative displacement in polarization angle between the light beams emitted from the plurality of light emitting portions, said setting means comprising a scanning optical element made of a resin, which is shift-decentered perpendicularly to a sub scanning direction and rotary-decentered about the main scanning direction.

9. A multi-beam scanning optical apparatus comprising:

incident optical means for making a plurality of light beams emitted from light source means having a plurality of light emitting portions incident on deflection means;

scanning optical means for forming images of the plurality of light beams deflected by said deflection means on a surface to be scanned, wherein said scanning optical means has at least one scanning optical element made of a resin, and wherein, if h is a sub-scanning width of said scanning optical element made of the resin and d is an optical-axis-direction width, $h/d \leq 1.8$ is satisfied; and at least one setting means for setting an interval error between scanning lines in a sub-scanning line direction, the interval error being caused by a relation in which polarization angles of the light beams emitted from the plurality of light emitting portions are not parallel or orthogonal with each other, to be not more than 1/5 of a desired scanning line interval.

10. A multi-beam scanning optical apparatus comprising:

incident optical means for making a plurality of light beams emitted from light source means having a plurality of light emitting portions incident on deflection means;

scanning optical means for forming images of the plurality of light beams deflected by said deflection means on a surface to be scanned, wherein said scanning optical means has at least one scanning optical element made of a resin, and wherein, if h is a sub-scanning width of said scanning optical element made of the resin and t is a sub-scanning width of the light beam passing through said scanning optical element made of the resin h/t ≦15 is satisfied; and at least one setting means for setting an interval error between scanning lines in a sub-scanning line direction, the interval error being caused by a relation in which polarization angles of the light beams emitted from the plurality of light emitting portions are not parallel or orthogonal with each other, to be not more than 1/5 of a desired scanning line interval.

11. A multi-beam scanning optical apparatus comprising:

light source means having a plurality of light emitting portions, the light emitting portions emitting a plurality of light beams whose polarization directions are neither parallel nor orthogonal with each other, incident optical means for carrying the plurality of light beams emitted from the light emitting portions of said light source means onto deflection means; and scanning optical means for forming images of the plurality of light beams deflected by deflection means on a surface to be scanned, wherein said scanning optical means has at least one scanning optical element made of a resin, and wherein letting h be a sub-scanning width of the scanning optical element and d be an optical-axis-direction width of the scanning optical element, h/d ≦1.8 is satisfied, and wherein an angle difference of polarized directions of the light beams emitted from said plurality of the light emitting portions of the light source means is equal to or less than 20 degree to keep an error range of intervals between scanning lines used in forming of the images in a sub-scanning direction within a range not more than 1/5 of a desired scanning line interval.

12. A multi-beam scanning optical apparatus comprising:

light source means having a plurality of light emitting portions, the light emitting portions emitting a plurality of light beams whose polarization directions are neither parallel nor orthogonal with each other, incident optical means for carrying the plurality of light beams emitted from the light emitting portions of said light source means onto deflection means; and scanning optical means for forming images of the plurality of light beams deflected by deflection means on a surface to be scanned, wherein said scanning optical means has at least one scanning optical element made of a resin, and wherein letting h be a sub-scanning width of the scanning optical element and t be an sub-scanning width of a light beam passing through the scanning optical element made of the resin, h/t ≦15 is satisfied; and wherein an angle difference of polarized directions of the light beams emitted from said plurality of the light emitting portions of the light source means is equal to or less than 20 degrees to keep an error range of intervals between scanning lines used in forming of the images in a sub-scanning direction within a range not more than 1/5 of a desired scanning line interval.

13. A multi-beam scanning optical apparatus comprising:

light source means having a plurality of light emitting portions, the light emitting portions emitting a plurality of light beams whose polarization directions are neither parallel nor orthogonal with each other;

incident optical means for carrying the plurality of light beams emitted from the light emitting portions of said light source means onto deflection means; and scanning optical means having a plurality of scanning optical elements, for forming images of the plurality of light beams deflected by deflection means on a surface to be scanned, each of the scanning optical means being made of resin, wherein an angle difference of polarized directions of the light beams emitted from said plurality of the light emitting portions of the light source means is equal to or less than 20 degrees to keep an error range of intervals between scanning lines used in forming of the images in a sub-scanning direction within a range not more than 1/5 of a desired scanning line interval.

14. A multi-beam scanning optical apparatus comprising:

light source means having a plurality of light emitting portions, the light emitting portions emitting a plurality of light beams whose polarization directions are neither parallel nor orthogonal with each other, incident optical means for carrying the plurality of light beams emitting from the light emitting portions of said light source means onto deflection means; and scanning optical means having a plurality of refractive scanning optical elements made of a resin, for forming images of the plurality of light beams deflected by deflection means on a surface to be scanned, wherein an angle difference of polarized directions of the light beams emitted from said plurality of the light emitting portions of the light source means is equal to or less than 20 degrees to keep an error range of intervals between scanning lines used in forming of the images in a sub-scanning direction within a range not more than 1/5 of a desired scanning line interval.

15. A multi-beam scanning optical apparatus comprising:

light source means having a plurality of light emitting portions, the light emitting portions emitting a plurality of light beams whose polarization directions are neither parallel nor orthogonal with each other;

incident optical means for carrying the plurality of light beams emitted from the light emitting portions of said light source means onto deflection means; and scanning optical means for forming images of the plurality of light beams deflected by deflection means on a surface to be scanned, wherein said scanning optical means has at least one scanning optical element made of a resin, and wherein said scanning optical element is shift-decentered perpendicularly to a sub-scanning direction to keep an error range of intervals between scanning lines used in forming of the images in the sub-scanning direction within a range not more than 1/5 of a desired scanning line interval.

16. A multi-beam scanning optical apparatus comprising:

light source means having a plurality of light emitting portions, the light emitting portions emitting a plurality of light beams whose polarization directions are neither parallel nor orthogonal with each other;

incident optical means for carrying the plurality of light beams emitted from the light emitting portions of said light source means onto deflection means; and scanning optical means for forming images of the plurality of light beams deflected by deflection means on a surface to be scanned, wherein said scanning optical means has at least one scanning optical element made of a resin, and wherein said scanning optical element is rotary-decentered about a main scanning direction to keep an error range of intervals between scanning lines used in forming of the images in a sub-scanning direction within a range not more than 1/5 of a desired scanning line interval.

17. An image forming apparatus comprising:

a multi-beam scanning optical apparatus according to any one of claims 1, 2, 3, 4, 5, 6, 7, 8, 9, 10 or 11 to 16;

a photosensitive member disposed in the scanned surface;

a developer for developing, as a toner image, an electrostatic latent image formed on said photosensitive member by light beams scanned by said multi-beam scanning optical apparatus;

a transfer device for transferring the developed toner image onto a recording medium; and a fixing device for fixing the transferred toner image on the recording medium.

18. An image forming apparatus comprising:

said multi-beam scanning optical apparatus of any one of claims 1, 2, 3, 4, 5, 6, 7, 8, 9, 10 or 11 to 16; and a printer controller for converting code data received from an external device into an image signal and inputting the image signal to said scanning optical apparatus.

* * * * *

UNITED STATES PATENT AND TRADEMARK OFFICE
CERTIFICATE OF CORRECTION

PATENT NO. : 7,098,938 B2  Page 1 of 1
APPLICATION NO. : 09/964658
DATED : August 29, 2006
INVENTOR(S) : Hiroki Yoshida It is certified that error appears in the above-identified patent and that said Letters Patent is hereby corrected as shown below:

COLUMN 7
    Line 50, "Ne" should read --No--.

COLUMN 22
    Line 10, "As" should be deleted.

COLUMN 26
    Line 23, "scanned" should read --scanned surface--.

COLUMN 27
    Line 64, "adjusting" should read --adjacent--.

COLUMN 29
    Line 50, "degree" should read --degrees--.

COLUMN 30
    Line 39, "emitting" should read --emitted--.

Signed and Sealed this

Twenty-second Day of May, 2007

JON W. DUDAS
*Director of the United States Patent and Trademark Office*